(12) United States Patent
Warinner et al.

(10) Patent No.: US 6,739,608 B2
(45) Date of Patent: May 25, 2004

(54) SUSPENSION SYSTEM FOR A VEHICLE

(75) Inventors: Derek K. Warinner, Fort Wayne, IN (US); James Korson, Fort Wayne, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 0 days.

(21) Appl. No.: 10/172,838

(22) Filed: Jun. 17, 2002

(65) Prior Publication Data

US 2003/0230865 A1 Dec. 18, 2003

(51) Int. Cl.[7] .............................................. B60G 11/46
(52) U.S. Cl. ............................................... 280/124.163
(58) Field of Search ................... 280/5.515, 124.157, 280/124.16, 124.161, 124.162, 124.163

(56) References Cited

U.S. PATENT DOCUMENTS

| | | | | |
|---|---|---|---|---|
| 3,578,355 A | * | 5/1971 | Oeder .................. | 280/124.163 |
| 3,730,549 A | * | 5/1973 | Turner, Jr. ........... | 280/124.163 |
| 3,730,550 A | * | 5/1973 | Thaxton .............. | 280/124.163 |
| 3,850,445 A | * | 11/1974 | Borns et al. .......... | 280/124.163 |
| 4,711,465 A | * | 12/1987 | Raidel ................. | 280/124.163 |
| 4,733,876 A | * | 3/1988 | Heider et al. ......... | 280/124.163 |
| 4,919,399 A | * | 4/1990 | Selzer et al. .......... | 280/124.163 |
| 5,046,752 A | * | 9/1991 | Stephens et al. ...... | 280/124.157 |
| 5,271,638 A | * | 12/1993 | Yale ..................... | 280/124.163 |
| 5,351,986 A | * | 10/1994 | Hedenberg et al. ... | 280/124.163 |
| 5,362,095 A | * | 11/1994 | Eveley ................. | 280/124.163 |
| 5,374,077 A | * | 12/1994 | Penzotti et al. ....... | 280/124.163 |
| 5,464,245 A | * | 11/1995 | Vogler ................. | 280/124.163 |
| 5,873,581 A | * | 2/1999 | Yale ..................... | 280/124.163 |
| 5,938,221 A | * | 8/1999 | Wilson ................ | 280/124.163 |
| 6,276,710 B1 | * | 8/2001 | Sutton ................. | 280/124.161 |
| 6,328,324 B1 | * | 12/2001 | Fenton ................ | 280/124.163 |
| 6,398,236 B1 | * | 6/2002 | Richardson .......... | 280/124.161 |
| 6,406,007 B1 | * | 6/2002 | Wilson ................ | 280/124.163 |
| 2003/0025288 A1 | * | 2/2003 | Petit ..................... | 280/124.163 |

* cited by examiner

Primary Examiner—Darren W. Ark
(74) Attorney, Agent, or Firm—Jeffrey P. Calfa; Dennis Kelly Sullivan; Susan L. Lukasik

(57) ABSTRACT

A novel suspension-system for a vehicle has two or more leaf-spring groups that vertically support a portion of the weight of a suspended structure of the vehicle. The novel suspension-system further includes pneumatic springs that are engaged to spring-support components of the novel suspension-system and also the suspended structure supported by the novel suspension-system in such a manner that the pneumatic springs assist the leaf-spring groups of the novel suspension system in vertically supporting the weight of the suspended structure.

3 Claims, 15 Drawing Sheets

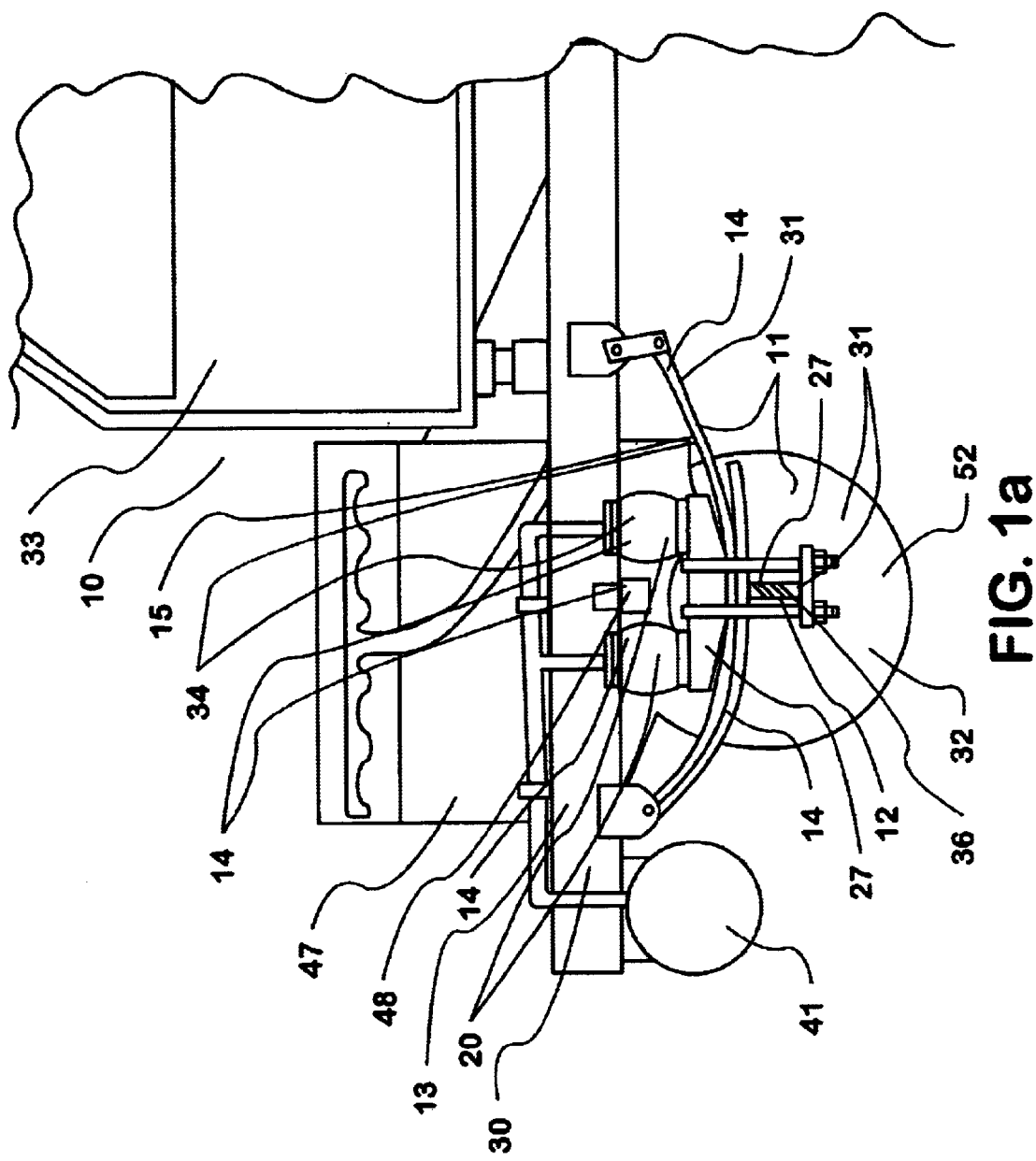

SUSPENSION SYSTEM FOR A VEHICLE

BACKGROUND OF THE INVENTION

The present invention relates to a suspension system of a vehicle. A suspension system of a vehicle being considered, for the purposes of this disclosure, to be a group of components engaged to and supported by either the ground or one or more support structure(s) and also engaged to and supporting one or more suspended structure(s). Additionally, a suspension system of a vehicle comprises one or more spring(s) that support the weight of the suspended structure(s) engaged to the suspension system. The spring(s) of a suspension system of a vehicle support the weight of the one or more suspended structure(s) that are engaged to the suspension system in a cushioned manner by flexing and allowing the suspended structure to move relative to the support structure(s) or ground, which support the suspension system, when the vertical accelerations of the suspended structure and/or the support structure change and/or when the loading of the suspended structure is changed. For instance, when a load is dropped upon the suspended structure or when a vehicle in motion travels over uneven terrain, the springs of the suspension system flex and transmit forces between the suspended structure and the support structure or ground that are much less than the impact forces that would be transmitted between the suspended structure and the support structure or the ground if the suspended structure were supported by components of greater stiffness than the springs of the suspension system. By supporting the suspended structure in such a cushioned manner, the springs of a suspension system of a vehicle provide for more gentle support of the suspended structure and occupants or cargo supported thereby. Such gentle support can result in longer life of the suspended structure, decreased incidence of damage to cargo supported by the suspended structure, and increased comfort for occupants supported by the suspended structure.

Known suspension systems of vehicles utilize a number of different types of springs to support the weight of suspended structures. One common type of spring that is used in known suspension systems of vehicles to support the weight of suspended structures is a leaf spring. Leaf springs are elongated members that are used as a flexible beam to support the weight of a suspended structure. Each leaf spring of a suspension system of a vehicle has a plurality of mounting portions one or more of which is/are support mounting-portions that are engaged directly or indirectly to and directly or indirectly support at least a part of the weight of the suspended structure. One or more of the mounting portions of each of the leaf springs is/are supported mounting-portion(s) that is/are disposed at points distant from the one or more support mounting-portion(s) and that is/are engaged directly or indirectly to and are directly or indirectly supported by spring-support components. The spring-support components that a supported mounting-portion of a spring of a suspension system may be part of the support structure that supports the suspension system or may be part of the suspension system itself. The portions of each leaf spring that are disposed between each support mounting-portion and each supported mounting-portion function as a beam to support the loads applied at the support mounting-portion. When the loads at each support mounting-portion change, the magnitude of the bending of the portion of the leaf spring between that support mounting-portion and the nearest supported mounting-portion changes in proportion to the change in the load at the support mounting-portion. Leaf springs can be used in a suspension system of a vehicle to provide a simple, cost-effective, and easy to design suspension system as compared to suspension systems that include only springs of types other than leaf springs for supporting the weight of the suspended structure. A suspension system of a vehicle with leaf springs can provide such benefits because many designs of leaf springs are strong enough in all directions perpendicular to their longitudinal axis and also along their longitudinal axis to provide full location of the suspended structure they support without assistance from other structural components acting in parallel to them. In other words, in addition to providing full support for the suspended structure in vertical directions, leaf springs of a suspension system of a vehicle are capable of providing full support for the suspended structure in lateral and longitudinal directions. The use of only leaf springs in a vehicle's suspension system to support the weight of the suspended structure does, however, have disadvantages as compared to the use of other types of springs for supporting the weight of the suspended structure. Leaf springs generally have greater weight than other types of springs with equivalent weight carrying capabilities. Due to a combination of factors which include weight carrying requirements, limitations in the length of leaf springs due to space constraints on a vehicle, and fatigue strength of the leaf springs, the use of leaf springs as opposed to other types of springs in a vehicle suspension system often requires greater spring rates of the leaf springs than would be necessary for other types of springs if employed. The greater spring rates that are often necessitated in a suspension system of a vehicle as a result of the use of leaf springs in lieu of other types of springs can result in a harsher ride for the occupants and cargo of the vehicle and reduced life of the suspended structure supported by the leaf springs. Additionally, many known designs of suspension systems of vehicles include leaf-spring packs, which include multiple leaf springs stacked upon one another to provide the requisite load carrying ability. One disadvantage of the use of such leaf-spring packs is that friction between each of the leaf springs and those positioned above and below it causes hysteresis in the reaction of the leaf-spring pack to changing loads. The hysteresis in leaf-spring packs results in the same negative consequences for suspension systems that utilize them as those negative consequences associated with increased spring rates.

Another type of spring that it is known to employ in suspension systems of vehicles to support suspended structures thereof is a pneumatic spring. Pneumatic springs comprise an expandable and contractable gas-compression chamber within which a gas, which is usually simply air, is compressed when the gas-compression chamber is contracted and within which the gas is expanded when the gas-compression chamber is expanded. Like leaf springs, pneumatic springs have two or more mounting portions. One or more of the mounting portions of a pneumatic spring of a suspension system of a vehicle is/are supported mounting-portions that are engaged directly or indirectly to and are supported directly or indirectly by spring-support components which may be components of the support structure that supports the suspension system or components of the suspension system itself. One or more of the mounting portions of a pneumatic spring of a suspension system of a vehicle is/are support mounting-portions that are engaged directly or indirectly to and support directly or indirectly the suspended structure that is supported by the suspension system. Gas pressure of the gas in the gas-compression chamber of a pneumatic spring directly or indirectly supports the support mounting-portions of the pneumatic spring. The components of a pneumatic spring that define its gas-compression chamber automatically move and/or elastically deform to positions and/or shapes that effect a volume of the gas-compression chamber at which the gas contained therein has a pressure that will just support the load applied to the support mounting-portion of the pneumatic spring. Pneumatic springs have little or no hysteresis, especially as compared to leaf-spring packs. Due to the relatively low hysteresis of pneumatic springs, the use of pneumatic springs in a suspension system of a vehicle generally provides for a more favorable ride than the use of leaf-spring packs, all other factors being equal. Most pneumatic springs that are traditionally used in suspension systems of vehicles, however, have the inherent disadvantage of being relatively weak in all modes of loading except for compression loading along axes between the support mounting-portion(s) and the supported mounting-portion(s) of the spring. For this reason, suspension systems of vehicles that utilize only pneumatic springs to support the weight of the suspended structure generally include relatively complex arrangements of linkages, which locate the suspended structure in those directions other than compression axes of the pneumatic springs thereof.

SUMMARY OF INVENTION

As a result, an object of the present invention is to provide a novel suspension-system for a vehicle, which novel suspension-system has relatively low hysteresis and which includes an arrangement of structural components of relatively little complexity for locating the suspended structure supported by the novel suspension-system.

The novel suspension-system for a vehicle of the present invention comprises one or more leaf springs and one or more pneumatic springs that act in parallel to one another to support the weight of a suspended structure supported by the novel suspension-system. The novel suspension-system of the present invention is constructed with the leaf springs thereof engaged to the other components of the vehicle in such a manner that they are capable of providing full lateral and longitudinal location of the suspended structure supported by the novel suspension-system. In most embodiments the leaf springs will, in fact, provide full lateral and longitudinal location of the suspended structure. Some constructions of a novel suspension system according to the present invention may, however, include components other than the leaf springs that are engaged to the suspended structure, without the inclusion of which in the novel suspension-system the leaf springs thereof would be fully capable of providing lateral and longitudinal location of the suspended structure, but which nonetheless do assist the leaf springs in providing lateral and longitudinal location of the suspended structure. The novel suspension-system of the present invention comprises two or more leaf-spring groups each of which comprises one or more leaf springs with its/their longitudinal axes disposed approximately horizontally. Each leaf-spring group comprises a primary leaf-spring. Each primary leaf-spring has two or more outer mounting-portions between which are disposed one or more inner mounting-portions. The outer mounting-portions of each primary leaf-spring are either both engaged directly or indirectly to the suspended structure or both engaged directly or indirectly to spring support component(s) that support the primary leaf-spring. Each of the inner mounting-portion(s) of a given primary leaf-spring is engaged directly or indirectly to whichever of the suspended structure and the spring-support components the outer mounting-portions are not engaged to. In other words, if the outer mounting-portions are engaged to the suspended structure the inner mounting-portion(s) is/are engaged to spring-support component(s) and if the outer mounting-portions are engaged to spring-support components the inner mounting-portion(s) is/are engaged to the suspended structure. One of the outer mounting-portions of each primary leaf-spring is an anchor portion of the primary leaf-spring. The anchor portion of each primary leaf-spring is engaged to either the suspended structure or a spring-support component in such a manner that, relative to whichever of the suspended structure and a spring-support component the anchor portion is engaged, translation of the anchor portion is prevented in all directions, rotation of the anchor portion about vertical axes is prevented, and rotation of the anchor portion about the longitudinal axis of the primary leaf-spring is prevented. The outer mounting-portion, of each primary leaf-spring, that is not an anchor portion is a reciprocating mounting-portion. The reciprocating mounting-portion of each primary leaf-spring is engaged to either the suspended structure or a spring-support component in such a manner that, relative to whichever of the suspended structure and a spring-support component the reciprocating mounting-portion is engaged to, translation of the reciprocating mounting-portion is prevented in all directions perpendicular to the longitudinal axis of the primary leaf-spring, rotation of the reciprocating mounting-portion about vertical axes is prevented, and rotation about the longitudinal axis of the primary leaf-spring is prevented. As a result of such engagements of the outer mounting-portions to either the suspended structure or spring-support components, each of the primary leaf-springs is prevented from moving relative to whichever of the suspended structure and the spring-support components the outer mounting-portions are engaged to with the exception of movement of portions of the primary leaf spring between the outer mounting portions when the primary leaf-spring deforms elastically. The inner mounting-portion(s) of each primary leaf-spring are engaged to either the suspended structure or one or more spring-support components in such a manner to rotationally and translationally fix the position of the inner mounting-portion(s) relative to whichever of the suspended structure and the spring-support components the inner mounting-portions are engaged to. As a result of this engagement of the inner mounting-portion(s) to the suspended structure or the spring-support component(s), movement of each of the primary leaf-springs relative to whichever of the suspended structure and the spring-support component(s) the inner mounting-portion(s) is/are mounted to is limited to movement of portions of the primary leaf-spring between the inner mounting-portion(s) and the outer mounting-portions when the primary leaf-spring deforms elastically. Thus, each of the two or more primary leaf-springs of the novel suspension-system is prevented from moving relative to both the suspended structure and the spring-support components with the exception of movement of portions of the primary leaf-spring relative to the suspended structure and the spring support components when the primary leaf-spring elastically deforms. Thus, the engagement of the primary leaf-springs of the novel suspension-system to the suspended structure and the spring-support components is such that the suspended structure and the spring-support components can only move relative to one another when the primary leaf-springs deform elastically. The primary leaf-springs of the novel suspension-system have sufficient tensile strength and resistance to buckling in directions parallel to their longitudinal axis and also have sufficient stiffness against bending within horizontal planes that they can transmit all lateral and longitudinal forces that are transmitted between the suspended structure and the spring-support components of the vehicle without the primary leaf-springs extending or buckling along their longitudinal axis or bending within horizontal planes. Thus, the primary leaf-springs of the novel suspension-system are capable of transmitting all horizontal forces between the suspended structure and the spring-support components without allowing any substantial relative horizontal movements between the suspended structure and the spring-support components. The stiffness against bending of the primary leaf-springs within vertical planes is, however, substantially less than their stiffness against bending within horizontal planes so that the primary leaf-springs can allow the intended controlled vertical movement of the suspended structure relative to the spring-support components.

In addition to leaf springs, the novel suspension-system of the vehicle of the present invention comprises one or more pneumatic springs which assist the leaf springs in vertically supporting the weight of the suspended structure of the vehicle. Each of the pneumatic springs of the novel suspension-system has a supported mounting-portion that is engaged directly or indirectly to one or more spring-support component(s) and a support mounting-portion that is engaged directly or indirectly to the suspended structure. The engagement of one or more of the pneumatic springs of the present invention to the suspended structure and the rest of the novel suspension-system is such that they act in parallel with the leaf-spring groups of the novel suspension-system to support the weight of the suspended structure. Because one or more of the pneumatic springs of the novel suspension-system act in parallel with the leaf-spring groups, and, thus, reduce the weight that must be supported by the leaf-spring groups, the leaf-spring groups may be constructed with a lower spring rate than would be necessary absent the pneumatic springs to assist the leaf-spring groups in supporting the suspended structure. For this reason, each of the leaf-spring groups of the novel suspension-system can be constructed with a lesser number of leaf springs, which reduces the hysteresis of the leaf-spring group and the novel suspension-system as a whole.

Thus, it can be seen that the above-mentioned object, as well as others not mentioned, have been met by the novel suspension-system for a vehicle of the present invention. The leaf-spring groups of the novel suspension-system function to laterally and longitudinally locate the suspended structure without the aid of complicated linkage assemblies. Further, as a result of the use of the pneumatic springs to assist the leaf-spring groups in supporting the suspended structure, the novel suspension-system of the present invention provides a less harsh ride than a traditional suspension-system that utilizes only leaf springs to support the weight of the suspended structure.

DRAWINGS

Other objects and advantages of the invention will become more apparent upon perusal of the detailed description thereof and upon inspection of the drawings in which:

FIG. 1a is a side view of a front portion of a vehicle 10 that has a novel suspension-system according to the present invention with leaf-spring groups of the novel suspension-system comprising only one weight-supporting leaf-spring and wherein the general features of the vehicle and suspension system are pointed out by reference characters.

Figure 1B:
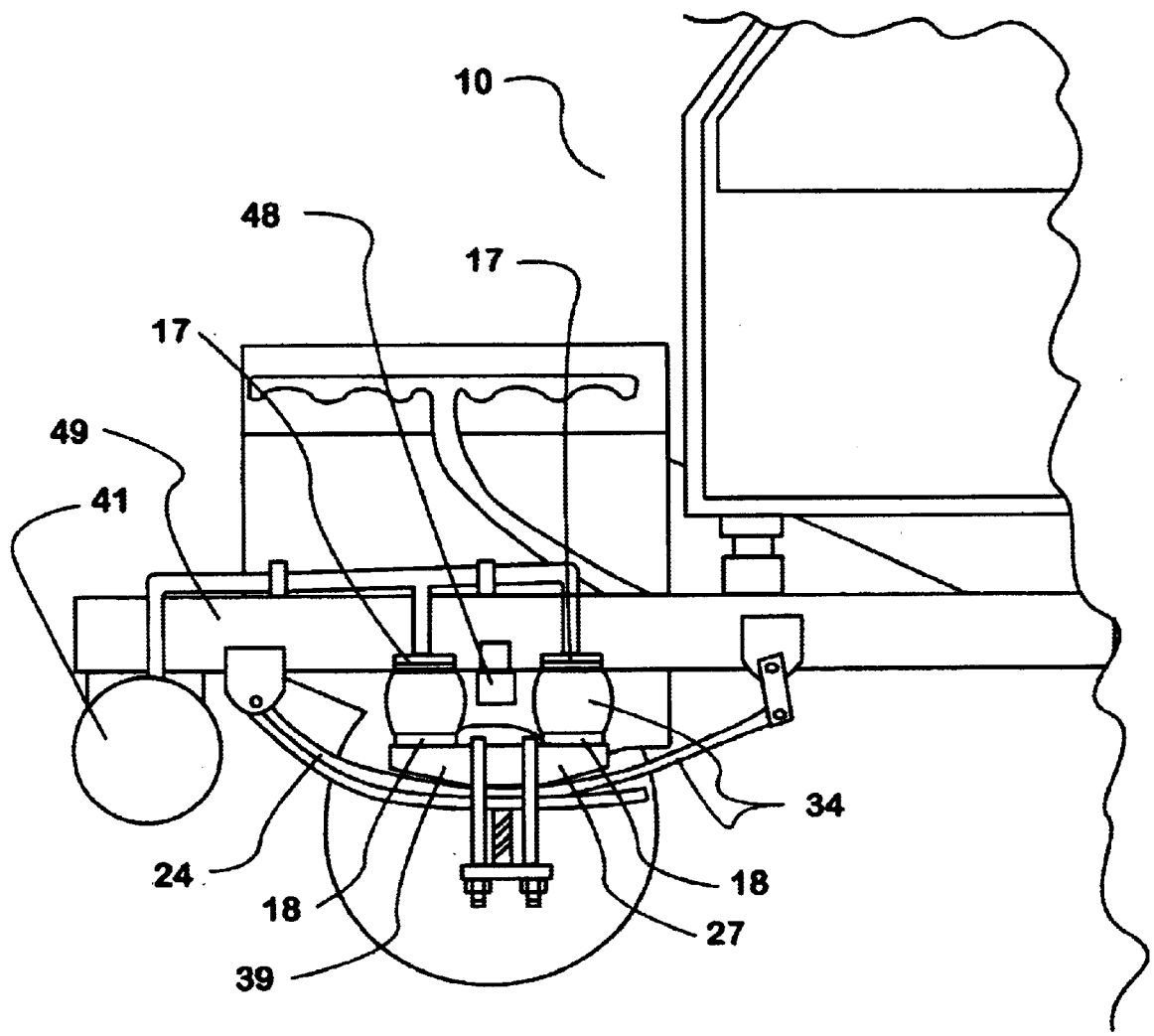
FIG. 1b is a side view of a front portion of a vehicle 10 that has a novel suspension-system according to the present invention with leaf-spring groups of the novel suspension-system comprising only one weight-supporting leaf-spring and wherein the features related to the pneumatic springs of the novel suspension-system are pointed out by reference characters.
Figure 1C:
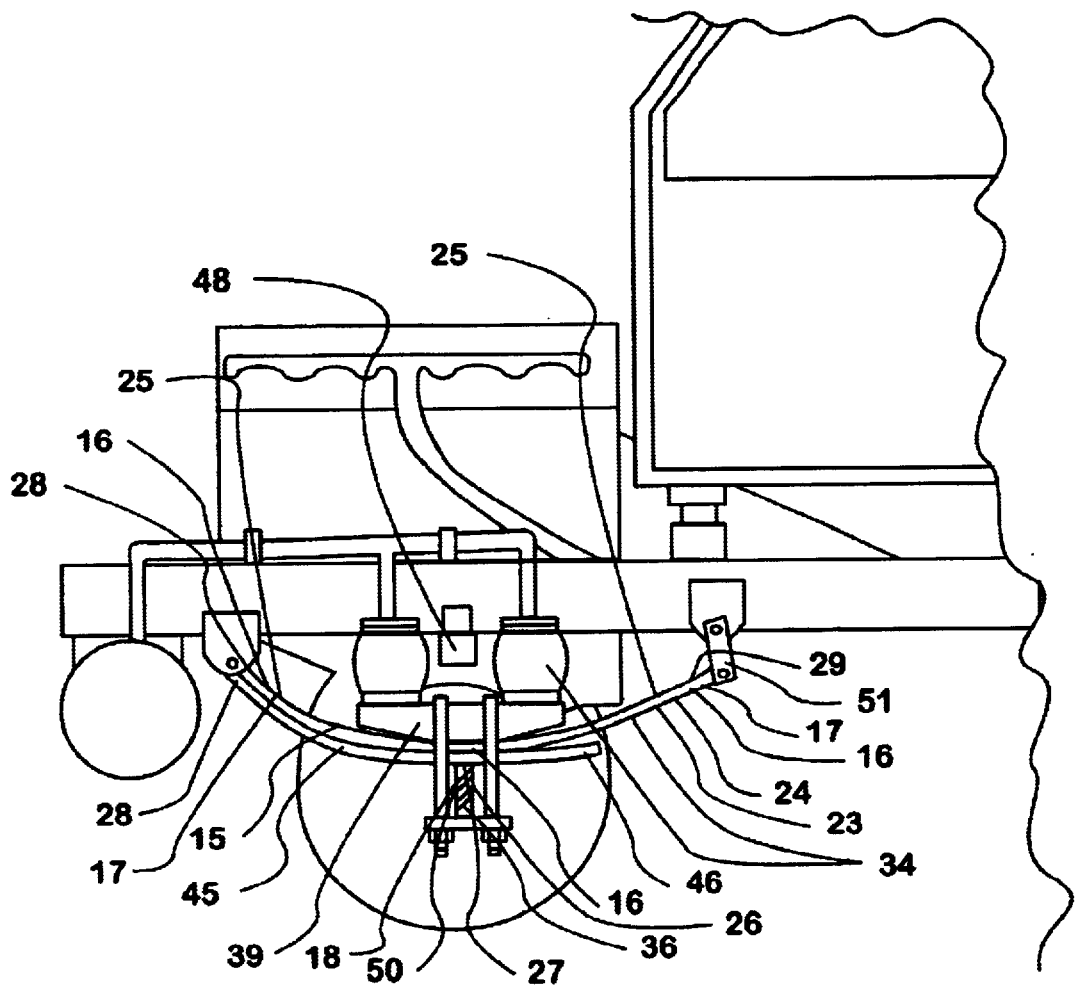
FIG. 1c is a side view of a front portion of a vehicle 10 that has a novel suspension-system according to the present invention with leaf-spring groups of the novel suspension-system comprising only one weight-supporting leaf-spring and wherein the features related to the leaf-spring groups of the novel suspension-system are pointed out by reference characters.
Figure 2A:
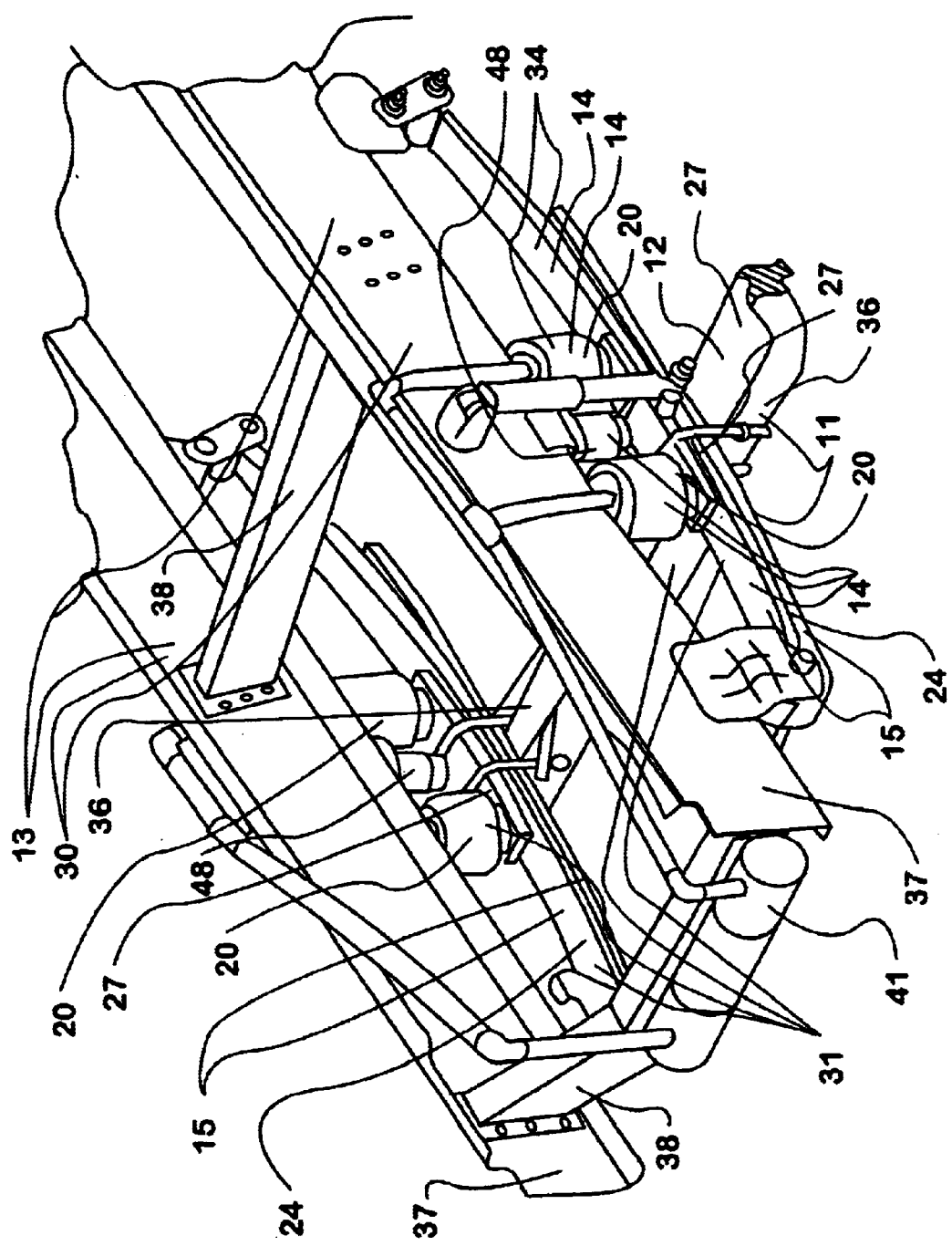
FIG. 2a is a perspective view of a part of a vehicle that includes a frame structure and novel suspension-system according to the present invention engaged thereto and wherein reference characters point out the general features of the frame structure and novel suspension-system.
Figure 2B:
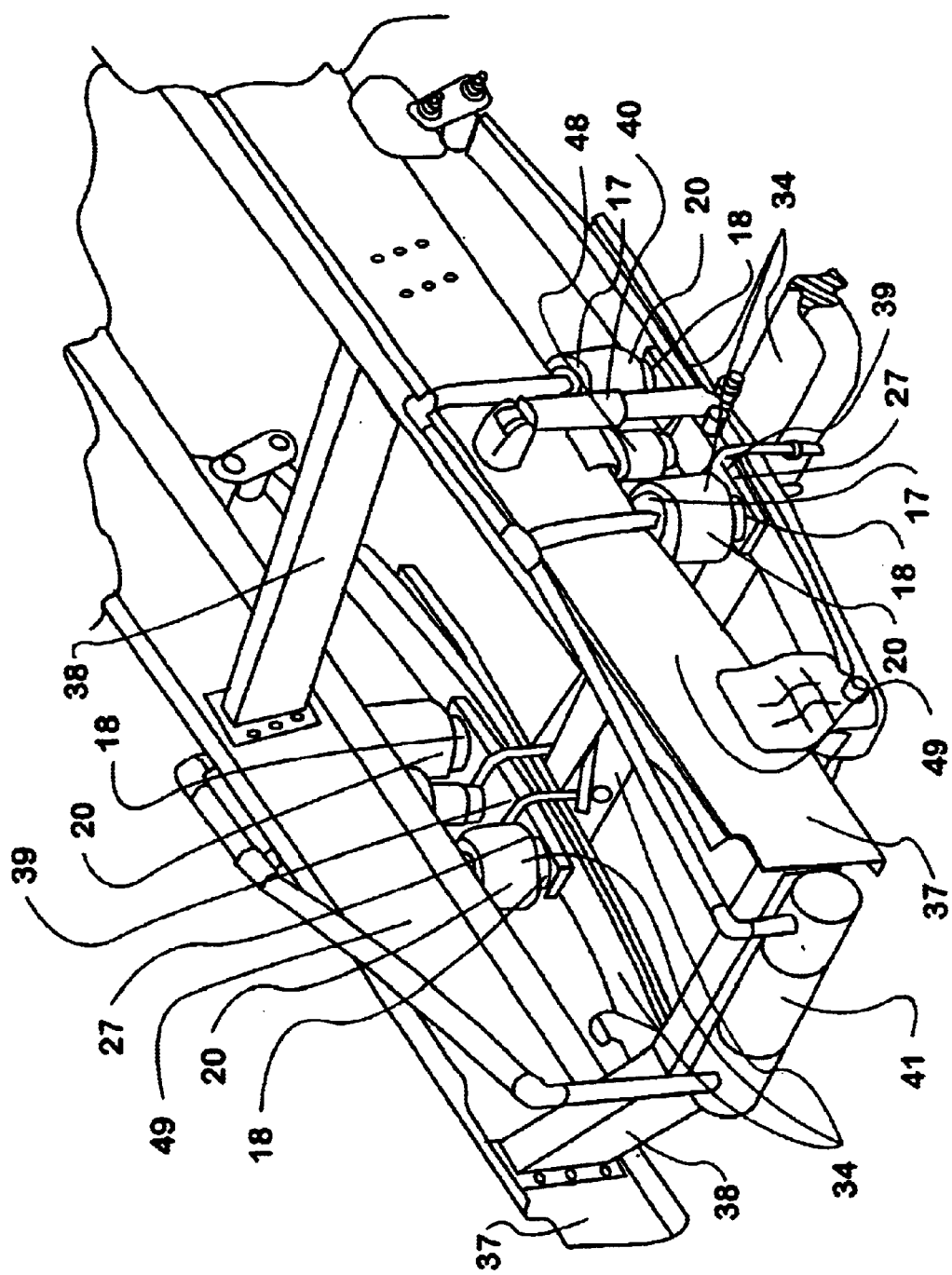
FIG. 2b is a perspective view of a part of a vehicle that includes a frame structure and novel suspension-system according to the present invention engaged thereto and wherein the features related to the pneumatic springs of the novel suspension-system are pointed out by reference characters.
Figure 2C:
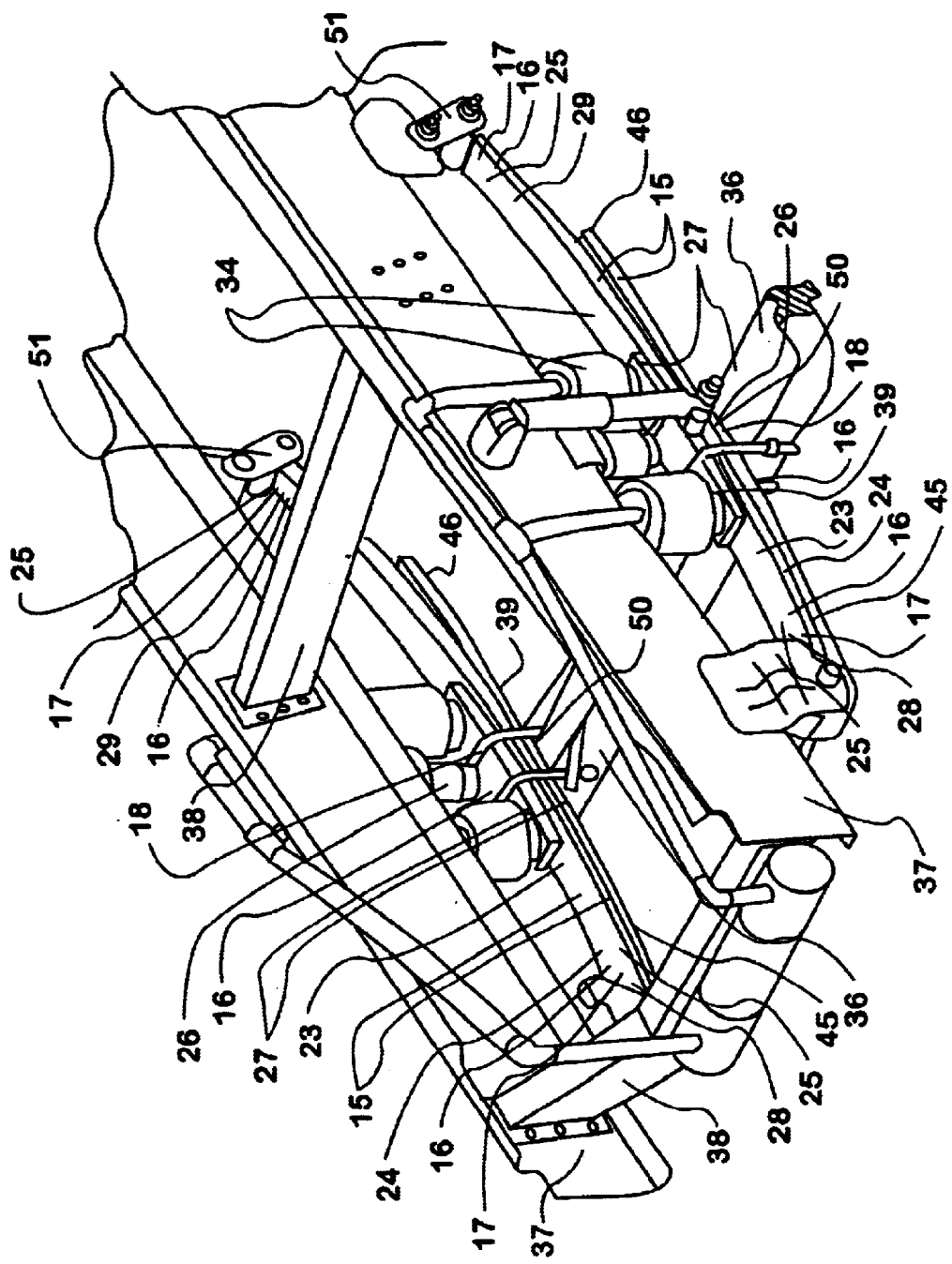
Figure 3A:
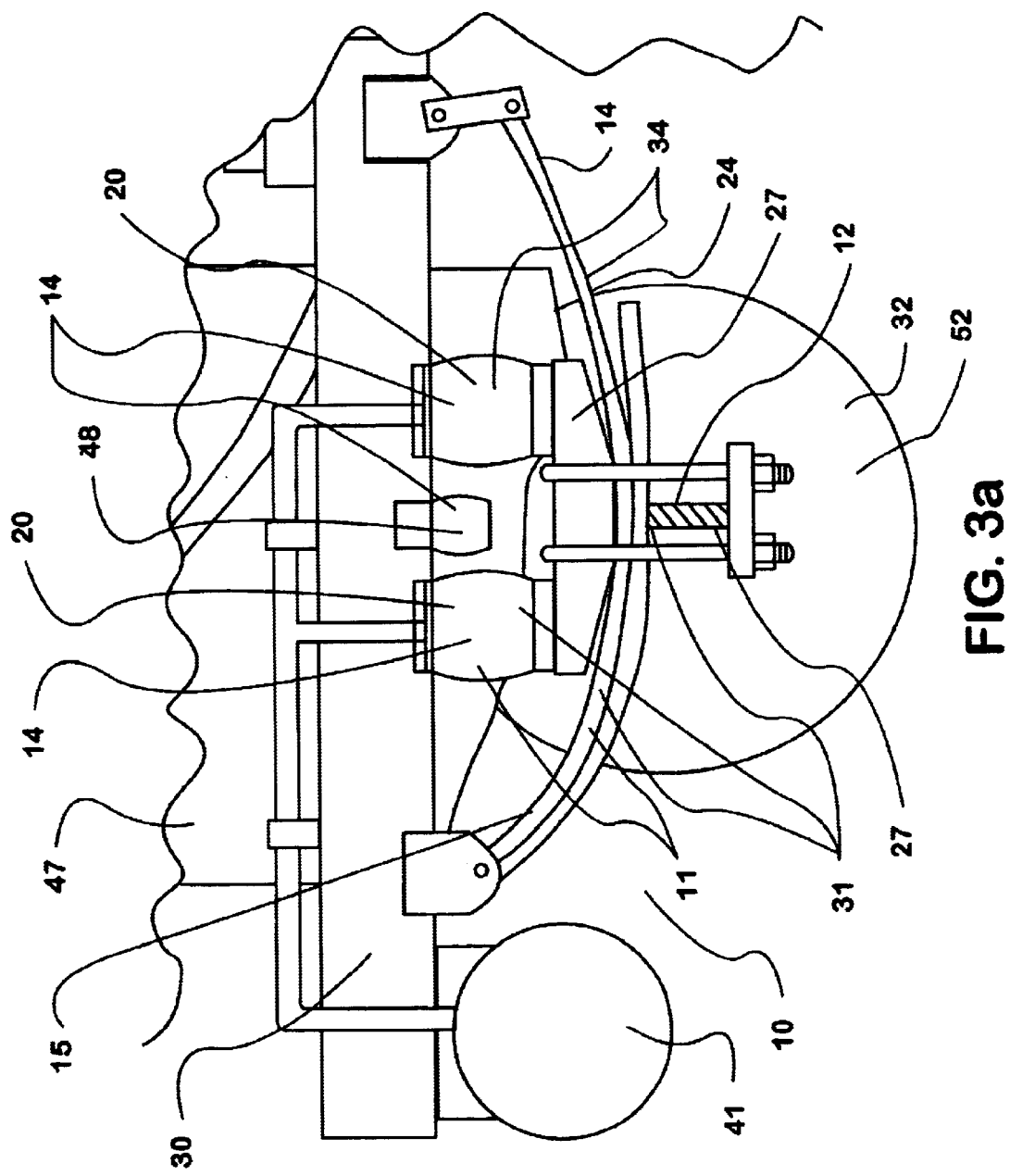

FIG. 2c is a perspective view of a part of a vehicle that includes a frame structure and novel suspension-system according to the present invention engaged thereto and wherein the features related to the leaf-spring groups of the novel suspension-system are pointed out by reference characters FIG. 3a is an enlarged side view of a front portion of a vehicle 10 that has a novel suspension-system according to the present invention with leaf-spring groups of the novel suspension-system comprising only one weight-supporting leaf-spring and wherein the general features of the vehicle and suspension system are pointed out by reference characters.

Figure 3B:
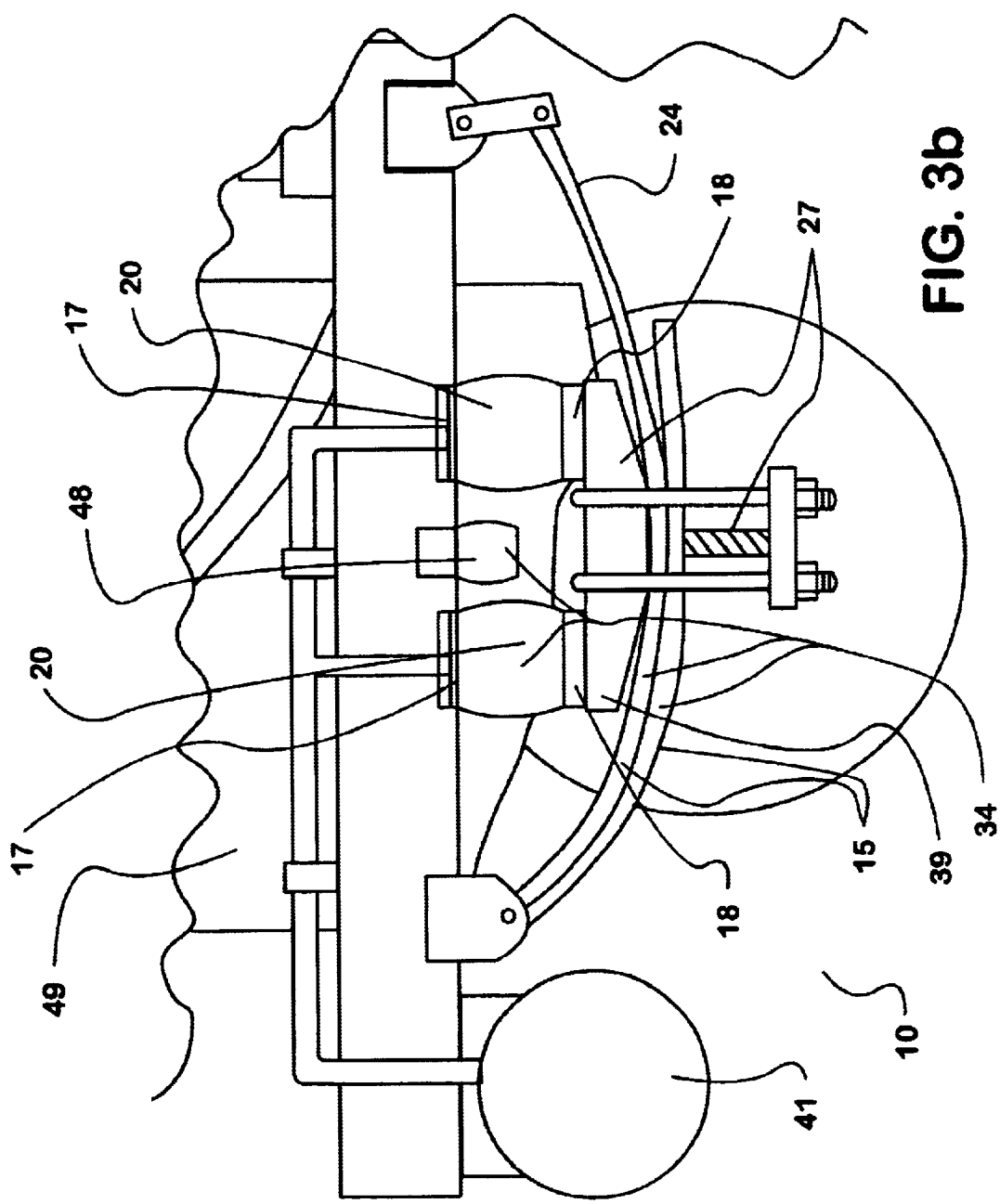

FIG. 3b is an enlarged side view of a front portion of a vehicle 10 that has a novel suspension-system according to the present invention with leaf-spring groups of the novel suspension-system comprising only one weight-supporting leaf-spring and wherein the features related to the leaf-spring groups of the novel suspension-system are pointed out by reference characters.

Figure 3C:
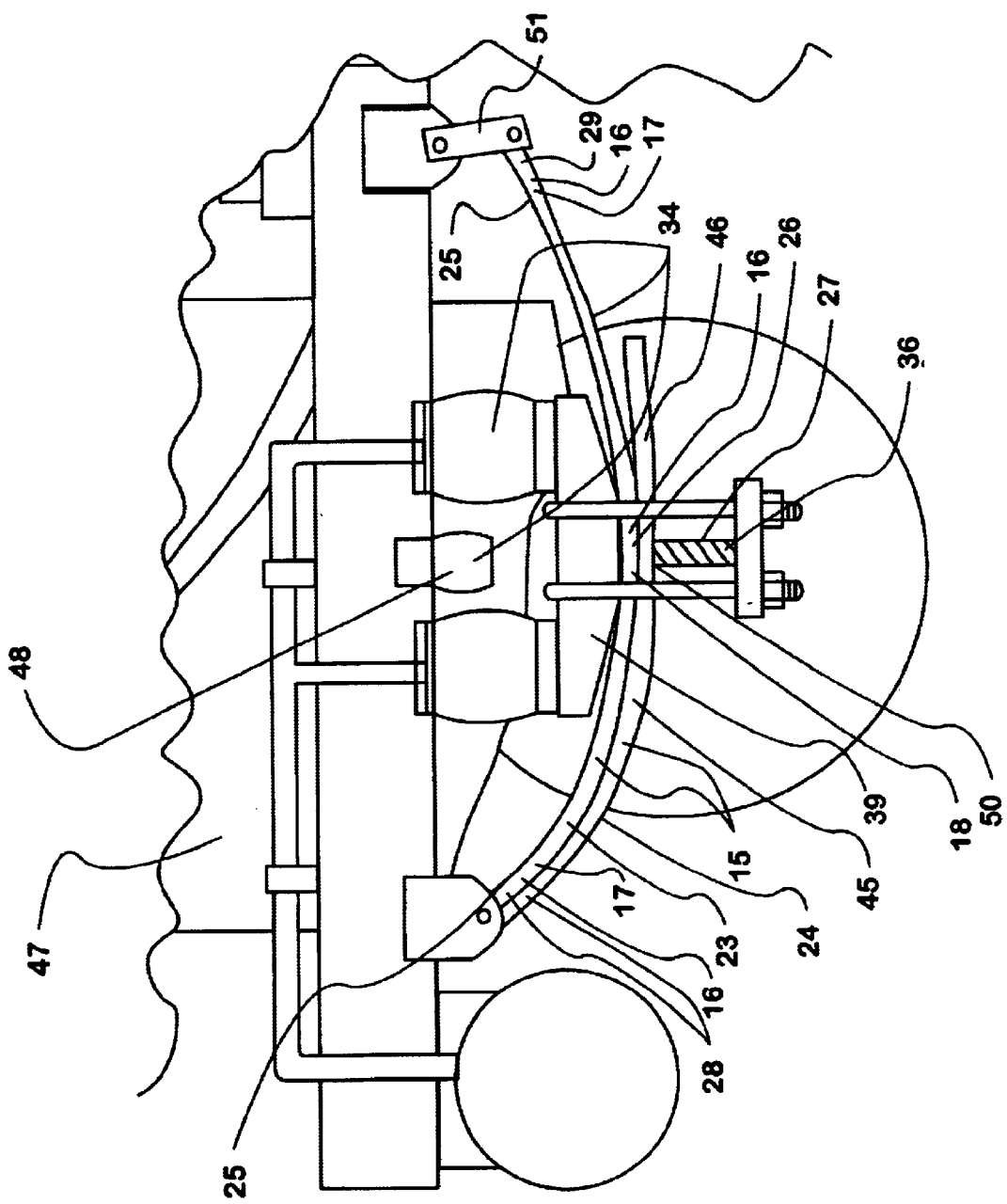

FIG. 3c is an enlarged side view of a front portion of a vehicle 10 that has a novel suspension-system according to the present invention with leaf-spring groups of the novel suspension-system comprising only one weight-supporting leaf-spring and wherein the features related to the leaf-spring groups of the novel suspension-system are pointed out by reference characters.

Figure 4A:
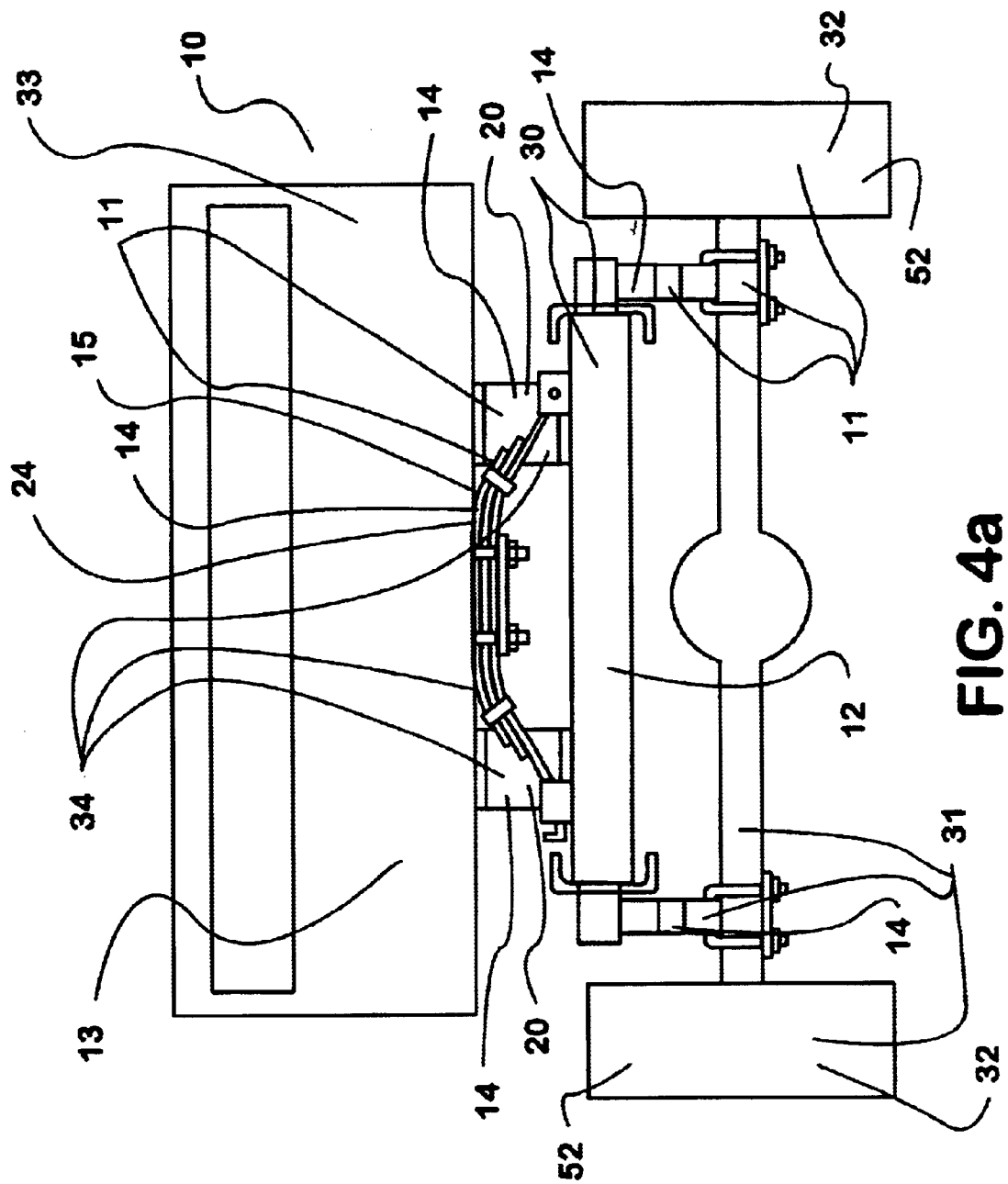

FIG. 4a is a rear view of a vehicle with a novel suspension-system according to the present invention supporting a body structure of the vehicle and wherein reference characters point out the general features of the vehicle and suspension system.

Figure 4B:
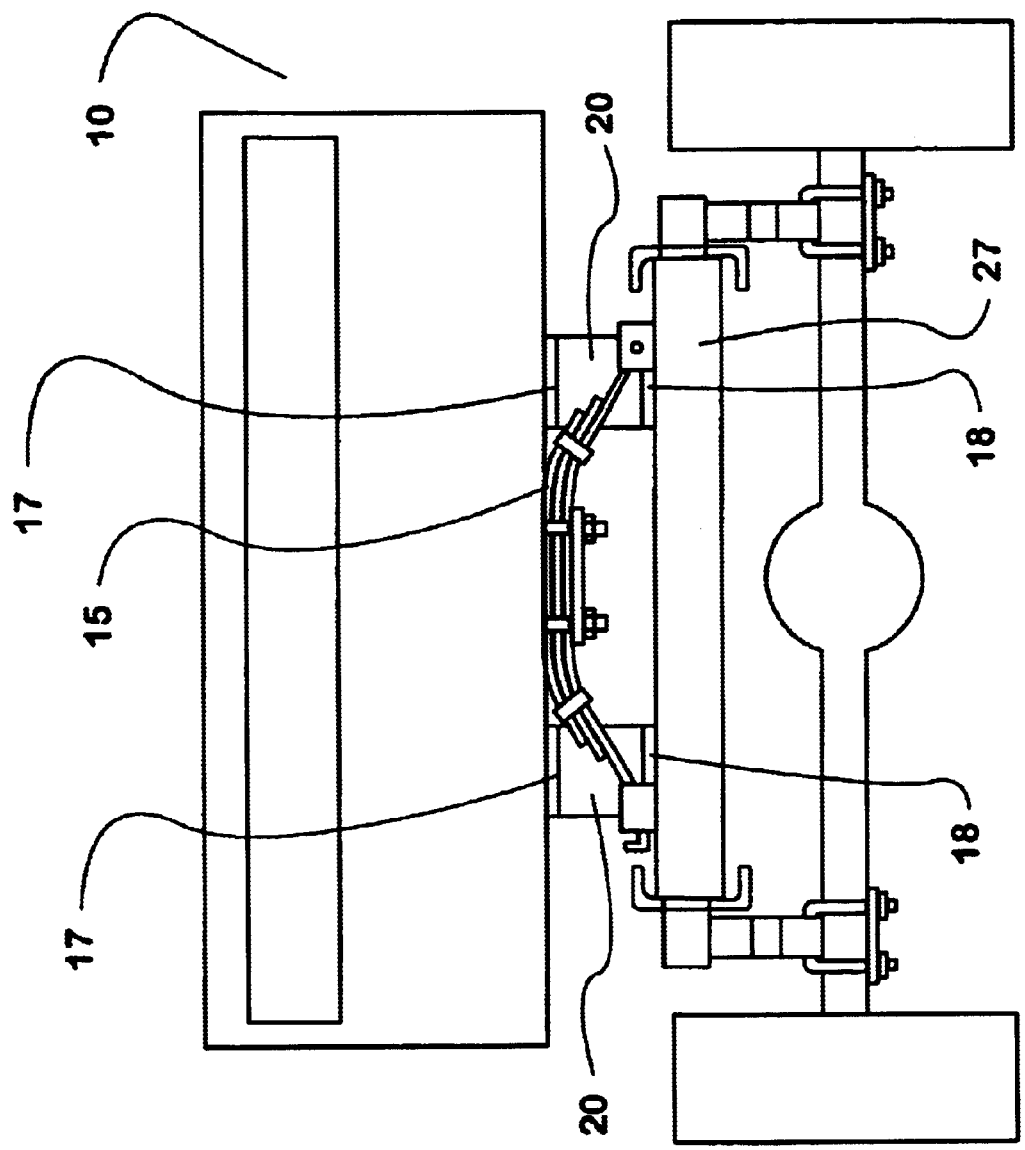

FIG. 4b is a rear view of a vehicle with a novel suspension-system according to the present invention supporting a body structure of the vehicle and wherein reference characters point out the features related to the leaf-spring groups of the novel suspension-system.

Figure 4C:
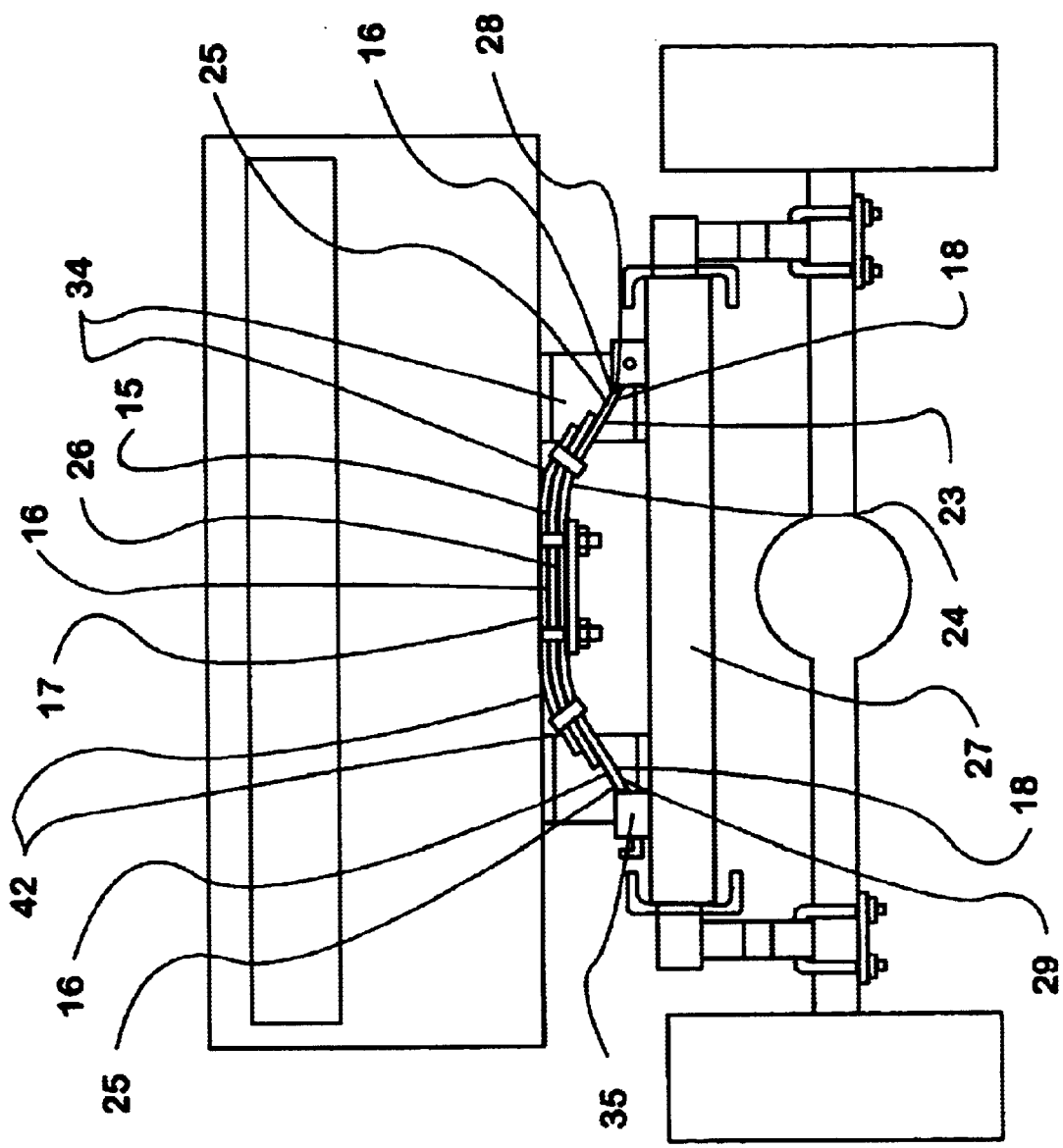

FIG. 4c is a rear view of a vehicle with a novel suspension-system according to the present invention supporting a body structure of the vehicle and wherein reference characters point out the features related to the leaf-spring groups of the novel suspension-system.

Figure 5A:
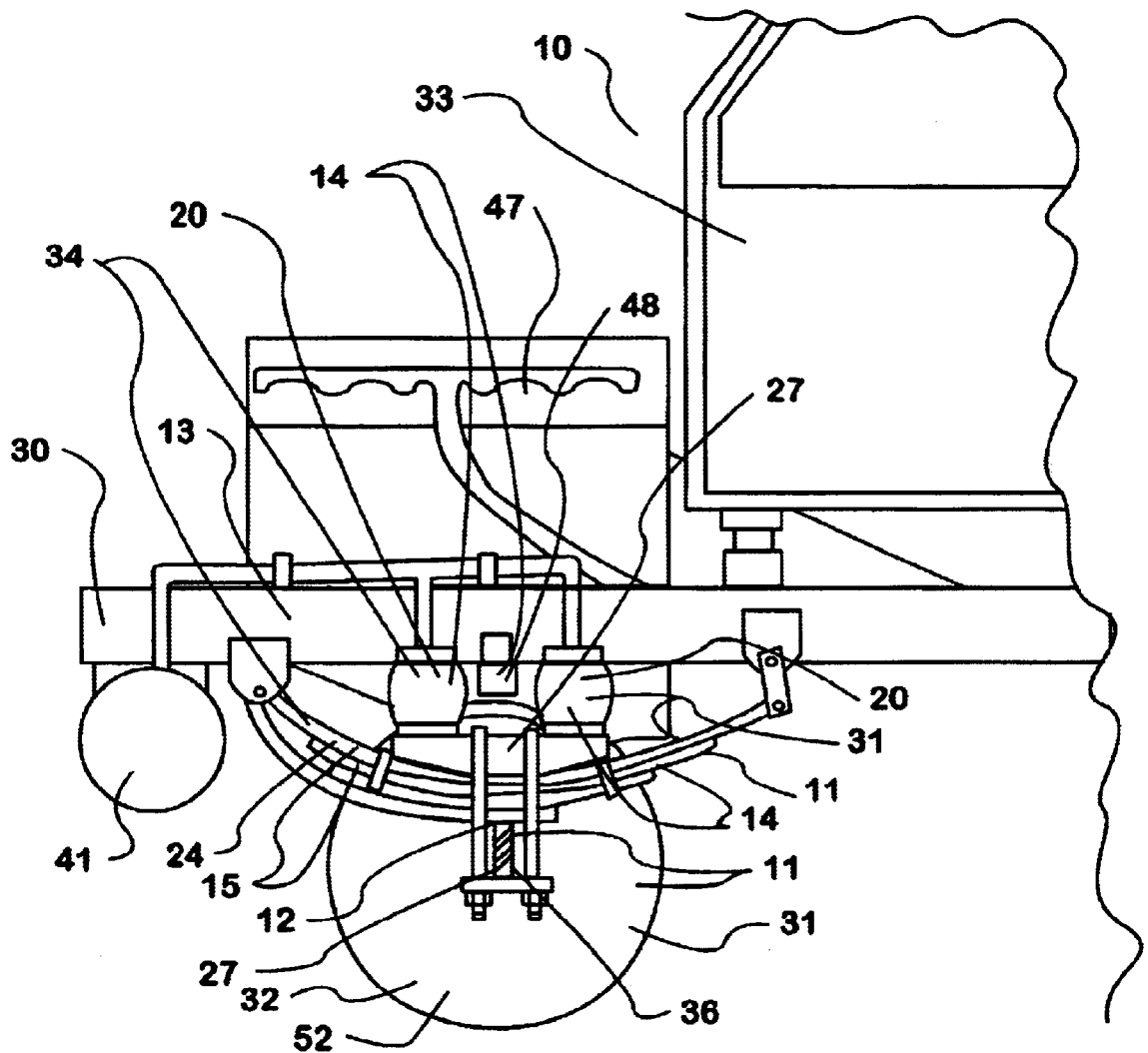

FIG. 5a is a side view of a front portion of a vehicle 10 that has a novel suspension-system according to the present invention with leaf-spring groups of the novel suspension-system comprising supplementary weight-supporting leaf-springs and wherein the general features of the vehicle and suspension system are pointed out by reference characters.

Figure 5B:
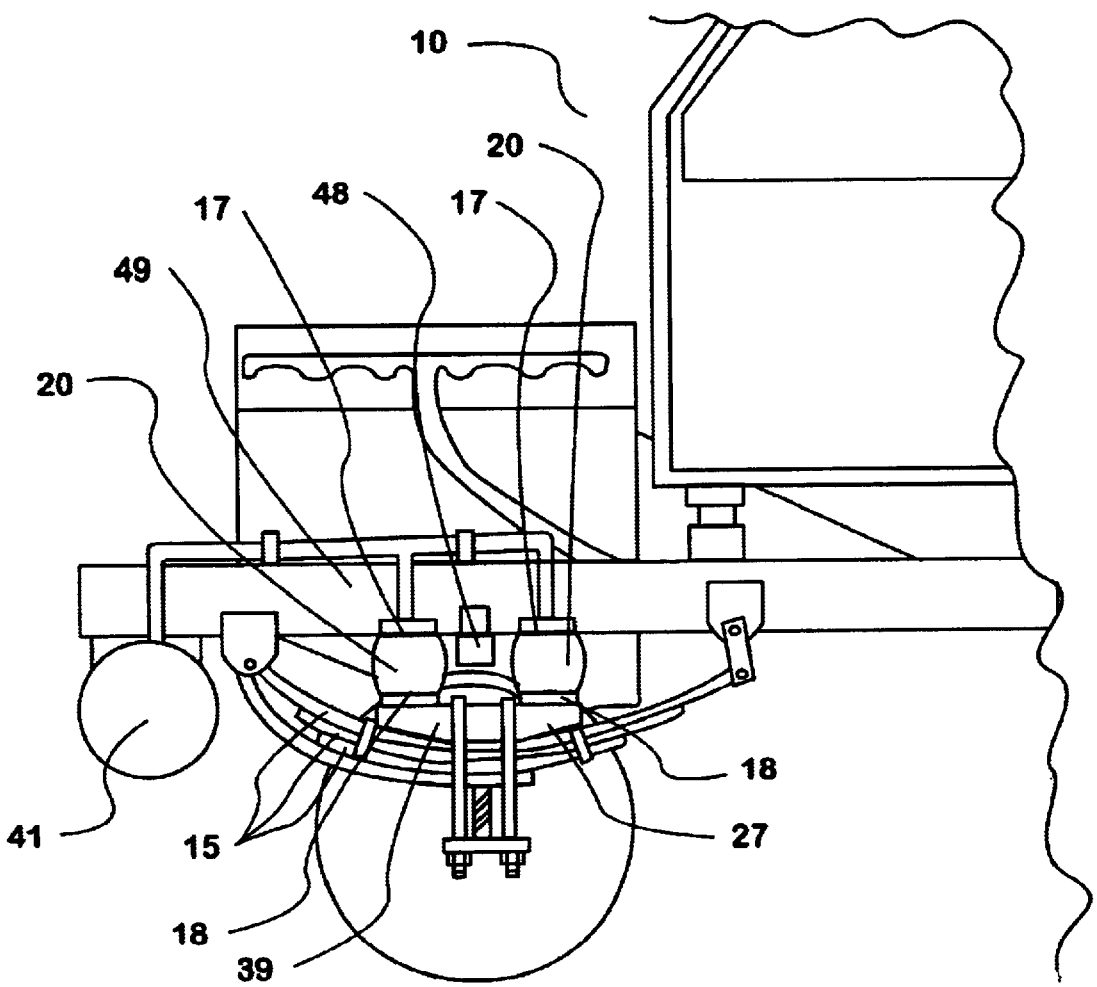

FIG. 5b is a side view of a front portion of a vehicle 10 that has a novel suspension-system according to the present invention with leaf-spring groups of the novel suspension-system comprising supplementary weight-supporting leaf-springs and wherein reference characters point out the features related to the leaf-spring groups of the novel suspension-system.

Figure 5C:
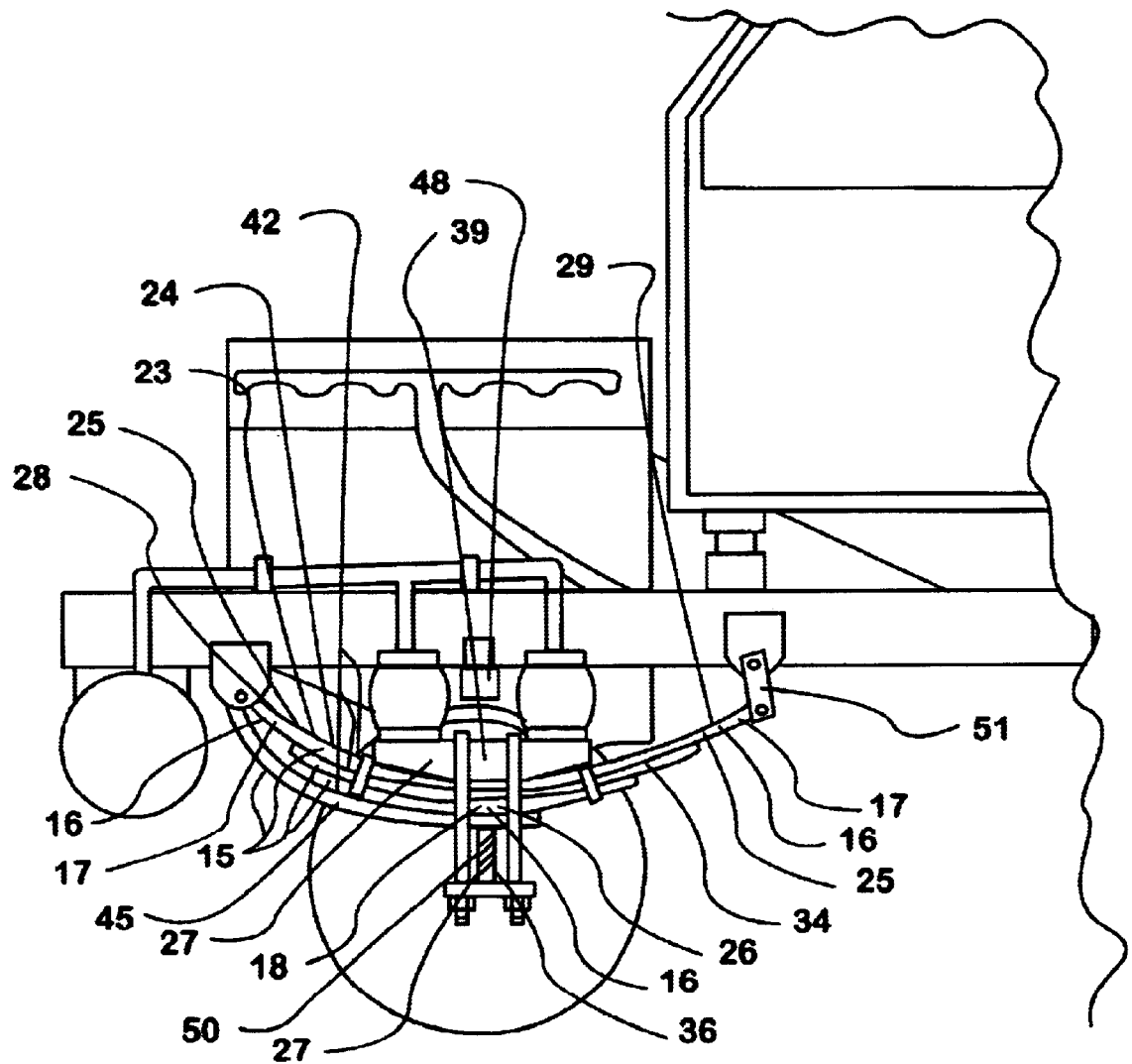

FIG. 5c is a side view of a front portion of a vehicle 10 that has a novel suspension-system according to the present invention with leaf-spring groups of the novel suspension-system comprising supplementary weight-supporting leaf-springs and wherein reference characters point out the features related to the leaf-spring groups of the novel suspension-system.

DETAILS OF INVENTION

The present invention is a novel suspension-system 34 for a vehicle 10. As is shown in the drawings, such a vehicle 10 comprises one or more frame structures 30 to which a majority of other components of the vehicle 10 are directly or indirectly engaged and which provide the structural strength that maintains proper relative locations of these other components of the vehicle 10. Such a vehicle 10 also comprises a primary suspension-system 31 some part or all of which may be a novel suspension-system 34 according to the present invention. The primary suspension-system 31 of the vehicle 10 comprises one or more ground-engaging component(s) 32 such as wheel(s) 52, track(s), and/or runner(s) that move along the ground when the vehicle 10 is in motion. The primary suspension-system 31 of the vehicle 10 further comprises one or more springs 14, that are engaged between the ground-engaging component(s) and the frame structure(s) 30 of the vehicle 10, and which support the frame structure(s) 30 of the vehicle 10 in a cushioned manner. A vehicle 10 according to the present invention further comprises one or more body structure(s) 33, which may include cargo platforms, enclosed cargo bodies, and/or occupant enclosures, upon or within which cargo and occupants of the vehicle 10 may reside. Each of the body structure(s) 33 of the vehicle 10 is directly or indirectly engaged to and supported by, and in some vehicle constructions may even be one and the same as, one or more of the frame structure(s) 30 of the vehicle 10. One or more of the body structure(s) 33 of the vehicle 10 may be suspended by a novel suspension-system 34 according to the present invention.

Each novel suspension-system 34 according to the present invention comprises one or more leaf springs 15 and one or more pneumatic springs 20 that act in parallel to one another to support the weight of a suspended structure 13 supported by the novel suspension-system 34. Each novel suspension-system 34 of the present invention is constructed with the leaf springs 15 thereof engaged to the other components of the vehicle 10 in such a manner that they are capable of providing full lateral and longitudinal location of the suspended structure 13 supported by the novel suspension-system 34. In most embodiments, the leaf springs 15 will, in fact, provide full lateral and longitudinal location of the suspended structure 13. Some constructions of a novel suspension-system 34 according to the present invention may, however, include components other than the leaf springs 15 that are engaged to the suspended structure 13, without the inclusion of which in the novel suspension-system 34 the leaf springs 15 thereof would be fully capable of providing lateral and longitudinal location of the suspended structure 13, but which nonetheless do assist the leaf springs 15 in providing lateral and longitudinal location of the suspended structure 13. Each novel suspension-system 34 of the present invention comprises two or more leaf-spring groups 24 each of which comprises one or more leaf springs 15 with their longitudinal axes disposed approximately horizontally. Each leaf-spring group 24 comprises supported mounting-portions 18 which are engaged directly or indirectly to and are directly or indirectly supported by one or more spring-support components 27 and support mounting-portions 17 which are engaged directly or indirectly to and support the suspended structure 13. Each leaf-spring group 24 comprises a primary leaf-spring 23. Each primary leaf-spring 23 has two or more outer mounting-portions 25 between which are disposed one or more inner mounting-portion(s) 26. It will be understood that there may be portions of each primary leaf-spring 23 that extend beyond the outer mounting-portions 25 thereof. The outer mounting-portions 25 of each primary leaf-spring 23 either both constitute support mounting-portions 17, in which case they would both be engaged directly or indirectly to the suspended structure 13, or both constitute supported mounting-portions 18, in which case they are both engaged directly or indirectly to spring-support components 27. The inner mounting-portion(s) 26 of each primary leaf-spring 23 constitute whichever of support mounting-portions 17 and supported mounting-portions 18 the outer mounting-portions 25 of the primary leaf-spring 23 do not constitute, and are engaged to whichever of the suspended structure 13 and the spring-support component(s) 27 the outer mounting-portions 25 are not engaged to. In other words, if the outer mounting-portions 25 are support mounting-portions 17 and are engaged to the suspended structure 13, the inner mounting-portion(s) 26 are supported mounting-portions 18 and are engaged to spring-support component(s) 27 and if the outer mounting-portions 25 are supported mounting-portions 18 and are engaged to spring-support components 27, the inner mounting-portion(s) 26 are support mounting-portions 17 and are engaged to the suspended structure 13. The latter of these two scenarios is illustrated in FIG. 4. One of the outer mounting-portions 25 of each primary leaf-spring 23 is an anchor portion 28 of the primary leaf-spring 23. The anchor portion 28 of each primary leaf-spring 23 is engaged to either the suspended structure 13 or a spring-support component 27 in such a manner that, relative to whichever of the suspended structure 13 and a spring-support component 27 the anchor portion 28 is engaged, translation of the anchor portion 28 is prevented in all directions, rotation of the anchor portion 28 about vertical axes is prevented, and rotation of the anchor portion 28 about the longitudinal axis of the primary leaf-spring 23 is prevented. The engagement of the anchor portion 28 of each primary leaf-spring 23 to either the suspended structure 13 or a spring-support component 27 may be one of any of a number of different designs that are well-known and/or easily imaginable to one of ordinary skill in the art and that would effect such a restriction of movement of the anchor portion 28 of the primary leaf-spring 23. One such design is with the anchor portion 28 of the primary leaf-spring 23 fixedly engaged to whichever of the suspended structure 13 and the spring-support component 27 that it is engaged to. The preferred design, which is well-known, is with the anchor portion 28 of the primary leaf-spring 23 pivotally engaged about a horizontal axis perpendicular to the longitudinal axis of the primary leaf-spring 23 through a spring bushing to whichever of the suspended structure 13 and the spring-support component 27 the anchor portion 28 is engaged. The outer mounting-portion 25, of each primary leaf-spring 23, that is not an anchor portion 28 is a reciprocating mounting-portion 29. The reciprocating mounting-portion 29 of each primary leaf-spring 23 is engaged to either the suspended structure 13 or a spring-support component 27 in such a manner that, relative to whichever of the suspended structure 13 and a spring-support component 27 the reciprocating mounting-portion 29 is engaged to, translation of the reciprocating mounting-portion 29 is prevented in all directions perpendicular to the longitudinal axis of the primary leaf-spring 23, rotation of the reciprocating mounting-portion 29 about vertical axes is prevented, and rotation of the reciprocating mounting-portion about the longitudinal axis of the primary leaf-spring 23 is prevented. The engagement of the reciprocating mounting-portion 29 of each primary leaf-spring 23 to either the suspended structure 13 or a spring-support component 27 may be one of any of a number of different designs that are well-known and/or easily imaginable to one of ordinary skill in the art and that would effect such a restriction of movement of the reciprocating mounting-portion 29 of the primary leaf-spring 23. One well-known example of such a design is a slipper joint 35, as is shown in FIG. 4, wherein the reciprocating mounting-portion 29 of the primary leaf-spring 23 extends, in a direction along the longitudinal axis of the primary leaf-spring 23, through an opening in a slipper mounting bracket. The preferred design, which is also well-known, is with the reciprocating mounting-portion 29 pivotally engaged about a horizontal axis perpendicular to the longitudinal axis of the primary leaf-spring 23 through a spring bushing to a spring shackle 51, which is, in turn, pivotally engaged directly or indirectly to either the suspended structure 13 or a spring-support component 27 through a shackle bushing. As a result of such engagements of the outer mounting-portions 25 to either the suspended structure 13 or spring-support components 27, each of the primary leaf-springs 23 is prevented from moving relative to whichever of the suspended structure 13 and the spring-support components 27 the outer mounting-portions 25 are engaged to, with the exception of movement of portions of the primary leaf-spring 23 between the outer mounting-portions 25 when the primary leaf-spring 23 deforms elastically. The inner mounting-portion(s) 26 of each primary leaf-spring 23 is/are engaged to either the suspended structure 13 or one or more spring-support components 27 in such a manner to rotationally and translationally fix the position of the inner mounting-portion(s) 26 relative to whichever of the suspended structure 13 and the spring-support components 27 it/they are engaged to. There are many designs of engagement of the inner mounting-portion(s) 26 of the primary leaf-spring 23 to either the suspended structure 13 or one or more spring-support components 27 that are well-known and/or easily imaginable by one of ordinary skill in the art and that would effect such a restriction of movement between the inner mounting-portion(s) 26 and whichever of the suspended structure 13 and spring-support component(s) 27 it/they are engaged to. As is shown in the drawings, in the preferred embodiment the inner mounting-portion 26 of each of the primary leaf-springs 23 is fixedly engaged, as a result of being clamped between spring clamp components, to whichever of the suspended structure 13 and spring-support components 27 it is engaged to. As a result of this engagement of the inner mounting-portion(s) 26 to the suspended structure 13 or the spring-support component(s) 27, movement of each of the primary leaf-springs 23 relative to whichever of the suspended structure 13 and the spring-support component(s) 27 the inner mounting-portion(s) 26 is/are mounted to is limited to movement of portions of the primary leaf-spring 23 between the inner mounting-portion (s) 26 and the outer mounting-portions 25 when the primary leaf-spring 23 deforms elastically. Thus, each of the two or more primary leaf-springs 23 of the novel suspension-system 34 is prevented from moving relative to both the suspended structure 13 and the spring-support component(s) 27 with the exception of movement of portions of the primary leaf-spring 23 relative to the suspended structure 13 and the spring-support component(s) 27 when the primary leaf spring 23 elastically deforms. Thus, the engagement of the primary leaf-springs 23 of the novel suspension-system 34 to the suspended structure 13 and the spring-support component(s) 27 is such that the suspended structure 13 and the spring-support component(s) 27 can only move relative to one another when the primary leaf-springs 23 deform elastically. The primary leaf-springs 23 of the novel suspension-system 34 have sufficient tensile strength and resistance to buckling in directions parallel to their longitudinal axis and also have sufficient stiffness against bending within horizontal planes that they can transmit all lateral and longitudinal forces that are transmitted between the suspended structure 13 and the spring-support components 27 of the vehicle 10 without the primary leaf-springs 23 extending or buckling along their longitudinal axis or bending within horizontal planes. Thus, the primary leaf-springs 23 of the novel suspension-system 34 are capable of transmitting all horizontal forces between the suspended structure 13 and the spring-support components 27 without allowing any relative horizontal movements between the suspended structure 13 and the spring-support components 27. The stiffness against bending of the primary leaf-springs 23 within vertical planes is, however, substantially less than their stiffness against bending within horizontal planes so that the primary leaf-springs 23 can allow the intended controlled vertical movement of the suspended structure 13 relative to the spring-support component(s) 27.

In addition to leaf springs 15, the novel suspension-system 34 of the vehicle 10 of the present invention comprises one or more pneumatic springs 20 which assist the leaf springs 15 in vertically supporting the weight of the suspended structure 13. Each of the pneumatic springs 20 of the novel suspension-system 34 has a supported mounting-portion 18 that is engaged directly or indirectly to one or more spring-support component(s) 27 and a support mounting-portion 17 that is engaged directly or indirectly to the suspended structure 13. The engagement of one or more of the pneumatic springs 20 of the present invention to the suspended structure 13 and the rest of the novel suspension-system 34 is such that they act in parallel with the leaf-spring groups 24 of the novel suspension-system 34 to support the weight of the suspended structure 13. There are a number of different ways of engaging the pneumatic springs 20 of the novel suspension-system 34 of the present invention to other components of the novel suspension-system 34 and to the suspended structure 13 that are well-known and/or easily imaginable by one of ordinary skill in the art and that would cause the pneumatic springs 20 to act in parallel to the leaf-spring groups 24 of the novel suspension-system 34. In order to effect parallel operation of one or more of the pneumatic springs 20 and the leaf-spring groups 24 of the novel suspension-system 34, the novel suspension-system 34 must be constructed with the supported mounting-portion 18 of one or more of the pneumatic springs 20 connected to the support mounting-portions 17 of the leaf-spring groups 24 only through the supported mounting-portions 18 of the leaf-spring groups 24. In the preferred embodiment the vehicle 10 comprises one or more bridge structures 49, each of which extends between the structures to which the outer mounting-portions 25 of one of said primary leaf-springs 23 are engaged. Also, in the preferred embodiment, one or more of the pneumatic springs 20 have either their supported mounting-portion 18 or their support mounting-portion 17 mounted to this bridge structure 49 and whichever of their supported mounting-portion 18 and support mounting-portion 17 that is not mounted to the bridge structure 49, engaged directly or indirectly to the same structure as is/are the inner mounting-portion(s) 26 of the primary leaf-spring 23. Thus, in the preferred embodiment, these pneumatic springs 20 that are mounted to a bridge portion 49 are compressed between the bridge portion 49 that they are mounted to and the structure that inner mounting-portion(s) 26 of the primary leaf-spring 23 are engaged to, when the bridge portion 49 travels toward the structure to which the inner mounting-portion(s) 26 of the primary leaf-spring 23 is/are engaged. Because one or more of the pneumatic springs 20 of the novel suspension-system 34 act in parallel with the leaf-spring groups 24, and, thus, reduce the weight that must be supported by the leaf-spring groups 24, the leaf-spring groups 24 may be constructed with a lower spring rate than would be necessary absent the pneumatic springs 20 to assist the leaf-spring groups 24 in supporting the suspended structure 13. For this reason, each of the leaf-spring groups 24 of the novel suspension-system 34 can be constructed with a lesser number of leaf springs 15, which reduces the hysteresis of the leaf-spring group 24 and the novel suspension-system 34 as a whole.

As was alluded to above, a vehicle 10 according to the present invention may have only one, or more than one, novel-suspension system 34 according to the present invention. Additionally, the novel suspension-system 34 according to the present invention may be utilized to support any of a number of different types of suspended structures 13 of the vehicle 10. As is shown in FIG. 4 a body structure 33 of the vehicle 10 may be suspended by a novel suspension-system 34 according to the present invention. As is shown in all of the figures other than FIG. 4, a vehicle 10 according to the present invention may have a primary suspension-system 31 at least a portion of which may be a novel suspension-system 34 according to the present invention. In such an embodiment of a vehicle 10 of the present invention that has a primary suspension-system 31 that comprises a novel suspension-system 34 according to the present invention, one or more of the frame structure(s) 30 of the vehicle 10 are the suspended structure 13 that is supported by the novel suspension-system 34 of the present invention that is part of the primary suspension-system 31. In the preferred embodiment, at least a front-axle portion of the primary suspension-system 31 is a novel suspension-system 34 according to the present invention. In addition to or in lieu of the front-axle portion one or more rear-axle portions of the primary suspension-system 31 of a vehicle 10 according to the present invention may be a novel suspension-system 34 according to the present invention.

A vehicle 10 that has front-axle portions and/or rear-axle portions, of a primary suspension-system 31, that is/are novel suspension systems 34 according to the present invention and those novel suspension-systems 34 according to the present invention may be constructed in any of a number of different ways. The leaf-spring groups 24 of each novel suspension-system 34 may be arranged with their longitudinal axes disposed parallel to the longitudinal axis of the vehicle 10, with their longitudinal axes disposed transverse to the longitudinal axis of the vehicle 10, or with their longitudinal axes disposed at an angle between parallel and transverse to the longitudinal axis of the vehicle 10. In the preferred embodiment, each of the novel suspension-systems 34 of the vehicle 10 that constitutes part of the primary suspension-system 31 of the vehicle 10 has its leaf-spring groups 24 oriented with their longitudinal axes parallel to the longitudinal axis of the vehicle 10. The primary leaf-spring 23, of each of the leaf-spring groups 24 of each novel suspension-system 34 that constitutes part of the primary suspension-system 31 of the vehicle 10, may have its inner mounting-portion(s) 26 engaged to either spring-support component(s) 27 or to the suspended structure 13 of the vehicle 10. In the preferred embodiment, the primary leaf-spring 23, of each of the leaf-spring groups 24 of each novel suspension-system 34 that constitutes part of the primary suspension-system 31 of the vehicle 10, has an inner mounting-portion 26 that is a supported mounting-portion 18 and that is, thus, mounted to a spring-support component 27. Likewise, in the preferred embodiment, the primary leaf-spring 23, of each of the leaf-spring groups 24 of each novel suspension-system 34 that constitutes part of the primary suspension-system 31 of the vehicle 10, has outer mounting-portions 25 that are support mounting-portions 17 and that are, thus, engaged to one of the frame structure(s) 30 of the vehicle 10. In the preferred embodiment the spring-support component(s) 27 that supports the leaf-spring groups 24 of the novel suspension-system(s) 34 that are part of the primary suspension-system 31 of the vehicle 10 are axle beam(s) 36 of the primary suspension-system 31. The preferred embodiment of a vehicle 10 according to the present invention comprises a frame structure 30 that is constructed of two frame rails 37 that extend parallel to one another upon opposite lateral sides of the longitudinal axis of the vehicle 10 and that are connected to one another by frame cross-members 38. In the preferred embodiment the outer mounting-portions 25 of the primary leaf-springs 23, of the novel suspension-system(s) 34 that are part of the primary suspension-system 31 of the vehicle 10 are mounted to the underside of the frame rails 37. Thus a portion of each frame rail 37 that extends between portions thereof to which outer mounting-portions 25 of a primary leaf-spring 23 are mounted constitute bridge structures 49 as described above. The pneumatic springs 20 of a novel suspension-system 34 that is part of the primary suspension-system 31 of a vehicle 10 according to the present invention may be engaged to the other components of the novel suspension-system 34 and the frame structure(s) 30 of the vehicle 10 in any of a number of ways. In the preferred embodiment each of the pneumatic springs 20 of a novel suspension-system 34 that is part of the primary suspension system 31 of a vehicle 10 according to the present invention is situated either directly below or just slightly laterally offset from one of the frame rails 37 of the frame structure 30 and has its supported mounting-portion 18 directly or indirectly engaged to an axle beam 36. Thus, in the preferred embodiment, each pneumatic spring 20 of each novel suspension-system 34 that is part of the primary suspension-system 31 is compressed and extended between a frame rail 37 and an axle beam 36 when the frame rail 37 and the axle beam 36 move vertically relative to one another.

There are some applications in which it is particularly beneficial to utilize a novel suspension-system 34 according to the present invention. The vehicle 10 of the preferred embodiment includes a novel suspension-system 34 that is part of the primary suspension-system 31 of the vehicle 10 and that is further engaged to and supports a portion of the frame structure 30 thereof that supports an engine 47 of the vehicle 10. It is well-known to engage a portion of the primary suspension-system 31 of a vehicle 10 to a portion of the frame structure 30 of the vehicle 10 that supports an engine 47 thereof and to, thus, directly support the portion of the frame structure 30 that supports the engine 47. It is beneficial to have a suspension system directly support the portion of the frame structure 30 that supports an engine 47 because the engine 47 is a relatively heavy component of the vehicle 10 and directly supporting the portion of the frame structure 30 that supports the engine 47 with a suspension system helps to minimize bending stresses in the frame structure 30. Unfortunately, locating a suspension system and an engine 47 at a same portion of a frame structure 30 of a vehicle 10 can present significant difficulties in finding space for all of the components of the suspension system and the engine 47 and its associated components. In particular, it is often difficult to find space for a panhard bar of the suspension system around the oil pan of the engine 47. Because the novel suspension-system 34 of the present invention does not require a panhard bar, or other complicated systems of linkages it can be relatively easily engaged to the portion of a frame structure 30 that supports an engine 47 and fitted around the engine 47 and associated components thereof. Additionally, in the preferred embodiment, the axle beam 36 that is part of the novel suspension-system 34 that supports the portion of the frame structure 30 that supports the engine 47 is a steer type axle. The use of a novel suspension-system 34 as a steer-axle portion of the primary suspension-system 34 of the vehicle 10 is also particularly beneficial because the novel suspension-system 34 of the present invention is relatively easy to package around the space-consuming steering components that are associated with a steering type axle.

In the preferred embodiment, a novel suspension-system 34 according to the present invention that is part of the primary suspension-system 31 of the vehicle 10 includes a particularly cost effective and space efficient means of mounting each of the leaf-spring groups 24 and the pneumatic springs 20 of the novel suspension-system 34 to an axle beam 36 of the novel suspension-system 34. In the preferred embodiment one or more of the leaf-spring groups 24 of the novel suspension-system 34 has the inner mounting-portion 26 of its primary leaf-spring 23 clamped between an axle beam 36 of the novel suspension-system 34 and a leaf-spring clamp-plate 39. In the preferred embodiment the leaf-spring clamp-plates 39 also function as pneumatic-spring mounting-pads 39, the supported mounting-portion 18 of one or more of the pneumatic springs 20 of the novel suspension-system 34 is fixedly mounted to an upper side of each of the leaf-spring clamp-plate/pneumatic-spring mounting pads 39 and the support mounting-portion 17 of each of these pneumatic springs 20 is fixedly mounted to the underside of one of the frame rails 37 of the vehicle 10. Of course in other embodiments of a novel suspension-system 34 according to the present invention there may be a pneumatic-spring mounting-pad that is mounted above the axle beam 36, but that does not function to clamp a leaf-spring group 24 to the axle beam 36. Such a pneumatic-spring mounting-pad may have all of the same features as the leaf-spring clamp-plate/pneumatic-spring mounting-pads 39 of the preferred embodiment except that it is not used as a clamp plate for affixing the leaf-spring group 24 to the axle beam 36. Also, in the preferred embodiment one or more of the novel suspension-systems 34 of the vehicle 10 comprises one or more piston-in-cylinder damper component(s) 40, an upper end of which is engaged to one of the frame rails 37 of the vehicle 10 and a lower end of which is engaged to the novel suspension-system 34 through a bolt that extends through a horizontal bore in one of the leaf-spring clamp-plate/pneumatic-spring mounting-pads 39.

A novel suspension-system 34 according to the present invention may have any number of pneumatic springs 20 that act in parallel to the leaf-spring groups 24 of the novel suspension-system 34. In the preferred embodiment of the invention there is a plurality of pneumatic springs 20 for each of the leaf-spring groups 24 that the novel suspension-system 34 comprises. In the preferred embodiment one of the one or more novel suspension-systems 34 of the vehicle 10 comprises four pneumatic springs 20 that act in parallel with two leaf-spring groups 24. In this preferred embodiment the supported mounting-portion 18 of each of two pneumatic springs 20 is fixedly mounted to an upper side of a leaf-spring clamp-plate/pneumatic-spring mounting-pad 39 that is clamped to an upper side of an inner mounting-portion 26 of each primary leaf-spring 23. In the preferred embodiment, each leaf-spring clamp-plate/pneumatic-spring mounting-pad 39 comprises two pneumatic-spring mounting-wings, one of which extends forward of the axle beam 36 to which it is mounted and one of which extends rearward of the axle beam 36 to which it is mounted and to each of which a supported mounting-portion 18 of a pneumatic spring 20 is fixedly engaged. Having a same number of pneumatic springs 20 engaged to the leaf-spring clamp-plate/pneumatic-spring mounting-pad 39 in front of the axle beam 36 as are engaged to the leaf-spring clamp-plate/pneumatic-spring mounting-pad 39 behind the axle beam 36 balances the forces applied to the axle beam 36 by the pneumatic springs 20 so that they do not apply an axle-rotating torque to the axle beam 36.

The pneumatic springs 20 of each novel suspension-system 34 according to the present invention may be of any of a number of different constructions that are well-known to and/or easily imaginable by one of ordinary skill in the art. The pneumatic springs 20 may be a piston-in-cylinder design with the gas-compression chamber of the pneumatic spring 20 being defined within a region constrained by an inner wall of a rigid cylinder and an end face of a piston that is axially moveable within the rigid cylinder. In the preferred embodiment the pneumatic springs 20 comprise a flexible bladder within which the gas-compression chamber of the pneumatic spring 20 is defined and to opposite ends of which the supported mounting-portion 18 and the support mounting-portion 17 of the pneumatic cylinder 20 are attached. Such a construction of pneumatic springs 20 as is used in the preferred embodiment of the novel suspension-system 34 being widely known and used in suspension systems of medium-duty and heavy-duty truck vehicles.

The preferred embodiment of the novel suspension-system 34 of the present invention has provisions for effecting a relatively low spring rate and good durability of the pneumatic springs 20 thereof while keeping the pneumatic springs 20 relatively compact in height. In the preferred embodiment the novel suspension-system 34 comprises one or more remote gas-reservoirs 41 that are mounted at points distant from the pneumatic springs 20 and that the gas-compression chambers of one or more of the pneumatic springs 20 are in fluid communication with through means such as tubing. Each of the one or more remote gas-reservoir (s) 41 of the vehicle 10 may be mounted to virtually any component of the vehicle 10 that is structurally capable of supporting it and may be mounted in virtually any location on the vehicle 10 where there is a space present in which it is convenient to mount it. Any pneumatic springs that have their gas-compression chambers in fluid communication with one or more of the remote gas-reservoir(s) 41 compress the gas in the remote gas-reservoir(s) 41 in addition to the gas that is contained within their gas-compression chambers. The spring rate of a pneumatic spring 20 is dependent upon two factors—the amount that the volume of its gas-compression chamber increases or decreases for a given amount of linear movement of its support mounting-portion (s) 17 and its supported mounting-portion(s) 18 relative to one another and the total volume occupied by the gas that the pneumatic spring 20 pressurizes when it is loaded. All other factors being equal, the greater the change in volume for a given relative linear movement of the support mounting-portion 17 and the supported mounting-portion 18 of a pneumatic spring 20, the greater will be the spring rate of the pneumatic spring 20. Thus, for most designs of pneumatic springs 20, all other factors being equal, the greater the cross-sectional areas of the gas-compression chamber thereof perpendicular to the compression axis of the pneumatic spring 20 are, the greater will be the spring rate of the pneumatic spring 20. Additionally, all other factors being equal, the greater the volume occupied by the gas that is pressurized by the pneumatic spring 20 when it is loaded, the lesser the spring rate of the pneumatic spring 20. Thus, one way to decrease the spring rate of a given design of a pneumatic spring 20 is by increasing the length of its gas-compression chamber along its compression axis, and to thereby increase the volume occupied by the gas that is pressurized by the pneumatic spring 20 when it is loaded. Unfortunately, many known suspension systems of vehicles are constructed with pneumatic springs that have spring rates of magnitudes higher than optimal due to factors that limit the maximum lengths of the pneumatic springs thereof and the minimum cross-sectional areas of the gas-compression chambers of the pneumatic springs thereof. Many vehicle designs cause limits in the maximum length of the pneumatic springs 20 thereof because there simply are limits upon how much linear space can be allotted for the pneumatic springs 20. Additionally, some designs of pneumatic springs, such as the pneumatic springs 20 of the preferred embodiment which have a flexible bladder within which the gas-compression chamber thereof is defined, have inherent limitations in how long they can be without unacceptable buckling of the pneumatic spring occurring in service. The minimum cross-sectional areas of the gas-compression chamber of a pneumatic spring are affected by the magnitude of the load that the pneumatic spring must carry and the arrangement and construction of the components of a pneumatic spring. For a given arrangement and construction of the components of a pneumatic spring, there is a maximum pressure to which the gas in the gas-compression chamber of the pneumatic spring can be pressurized without causing failure of the components that define the gas-compression chamber. For a given maximum gas pressure that the pneumatic spring can withstand, the load that can be supported by the pneumatic spring is proportional to the cross-sectional areas of the gas-compression chamber of the pneumatic spring. Because one or more of the pneumatic springs 20 of the novel suspension-system 34 compress gas that occupies not only the volume of their gas-compression chambers but also the volume of the one or more remote gas-reservoir(s) 41 with which the gas compression chambers of those pneumatic springs are in fluid communication with, those pneumatic springs 20 that have their gas-compression chambers in fluid communication with one or more of the remote gas-reservoir(s) 41 have a lower spring rate than they would if their gas-compression chambers were isolated.

Each remote gas-reservoir 41 may be in fluid communication with the gas-compression chamber(s) of only one pneumatic spring 20, or alternatively may be in fluid communication with the gas-compression chambers of multiple pneumatic springs 20. In the preferred embodiment all pneumatic springs 20 that have their gas-compression chambers in fluid communication with a remote gas-reservoir 41, have their gas-compression chambers in fluid communication with a common remote gas-reservoir 41. There are a number of advantages to putting the gas-compression chambers of multiple pneumatic cylinders 20 of the novel suspension-system 34 in fluid communication with a common remote gas-reservoir 41. One advantage that such a construction provides is that it is possible to provide multiple pneumatic cylinders 20 with increased volumes of gas that they can pressurize while not necessitating location of multiple remote gas-reservoirs 41 on the vehicle 10. Fluid coupling of the gas-compression chambers of multiple pneumatic springs 20 to a common remote gas-reservoir 41 causes the spring rates of those pneumatic springs 20 with their gas-compression chambers in communication with those of other pneumatic springs 20 to be dependent upon the magnitude of compression of the other pneumatic springs 20 in addition to the factors that affect the spring rate of a pneumatic spring 20 with its gas-compression chamber isolated from those of other pneumatic springs 20. The spring rate of a pneumatic spring 20, which has its gas-compression chamber in communication with those of other pneumatic springs 20, will increase as the other pneumatic springs 20 are compressed to a greater extent and will decrease as the other pneumatic springs 20 are extended to a greater extent. In some circumstances, such an averaging of the spring rates of a group of pneumatic springs 20 that have their gas-compression chambers in fluid communication with one another can provide favorable ride characteristics for the suspended structure 13. For instance, in the preferred embodiment of the present invention the novel suspension-system 34 includes a plurality of pneumatic springs 20 that have gas-compression chambers that are in fluid communication with one another, one or more of which support a driver's side of a frame structure 30 of the vehicle 10 and one or more which support a passenger's side of the frame structure 30. In such a case the pneumatic springs 20 on the driver's side of the vehicle 10 will react with a softer spring rate when only the driver's side of the vehicle 10 is driven over a bump, than they will when both the driver's and passenger's sides of the vehicle 10 are simultaneously driven over a bump. Thus, by having the gas-compression chambers of the pneumatic springs 20 in fluid communication with one another, the preferred embodiment of the novel suspension-system 34 provides for a softer ride over uneven terrain than do embodiments of the novel suspension-system 34 in which the gas-compression chambers of the pneumatic springs 20 thereof are isolated from one another. In order to take advantage of the benefits of having the gas-compression chambers of a plurality of pneumatic springs 20 in communication with one another, the novel suspension-system 34 of the present invention may have a plurality of pneumatic springs 20 that have their gas-compression chambers in fluid communication with one another through means such as tubing whether or not their gas-compression chambers are in fluid communication with any remote gas-reservoir(s) 41.

Each of the leaf-spring groups 24 of a novel suspension-system 34 according to the present invention may include, in addition to the primary leaf-spring 23, one or more supplementary weight-supporting leaf-springs 42 that assist the primary leaf-spring 23 in supporting the weight of the suspended structure 13. A novel suspension-system 34 that includes such supplementary weight-supporting leaf-springs 42 is shown in FIG. 5. Each of the supplementary weight-supporting leaf-springs 42, that a leaf-spring group 24 may comprise, includes two outer mounting-portions 25 and one or more inner mounting-portion 26. Each of the supplementary weight-supporting leaf-springs 42, that a leaf-spring group 24 may include, has a first outer-mounting-portion that is engaged directly or indirectly to whichever of the suspended structure 13 and a spring-support component 27 the anchor portion 28 of the primary leaf spring 23 is engaged to. This first outer-mounting-portion of each supplementary weight-supporting leaf-spring 42 is engaged to the whichever of the suspended structure 13 and a spring-support component 27 that the anchor portion 28 of the primary leaf-spring 23 is, in such a manner that, relative movement between this first outer-mounting-portion and whichever of the suspended structure 13 and a spring-support component 27 that it is engaged directly or indirectly to is constrained in the same manner as is relative movement between the anchor portion 28 of the primary leaf-spring 23 and whichever of the suspended structure 13 and a spring support component 27 it is engaged to. That is, this first outer-mounting-portion of each of the supplementary weight-supporting leaf-springs 42 and whichever of the suspended structure 13 and a spring-support component 27 it is engaged to are prevented from translating in any direction relative to one another, are prevented from rotating about horizontal axes parallel to the longitudinal axis of the supplementary weight-supporting leaf-spring relative to one another, and are prevented from rotating about vertical axes relative to one another. Each of the supplementary weight-supporting leaf-springs 42, that a leaf-spring group 24 may include, has a second outer-mounting-portion that is engaged directly or indirectly to whichever of the suspended structure 13 and a spring-support component 27 the reciprocating mounting-portion 29 of the primary leaf-spring 23 is engaged to. This second outer-mounting-portion of each supplementary weight-supporting leaf-spring 42 is engaged to whichever of the suspended structure 13 and a spring-support component 27 that the reciprocating mounting-portion 29 of the primary leaf-spring 23 is, in such a manner that, relative movement between this second outer-mounting-portion and whichever of the suspended structure 13 and a spring-support component 27 that it is engaged directly or indirectly to is constrained in the same manner as is relative movement between the reciprocating mounting-portion 29 of the primary leaf-spring 23 and whichever of the suspended structure 13 and a spring support component 27 it is engaged to. That is, this second outer-mounting-portion of each of the supplementary weight-supporting leaf-springs 42 and whichever of the suspended structure 13 and a spring-support component 27 it is engaged to are prevented from translating in horizontal directions perpendicular to the longitudinal axis of the supplementary weight-supporting leaf-spring 42 relative to one another, are prevented from translating vertically relative to one another, are prevented from rotating about horizontal axes parallel to the longitudinal axis of the supplementary weight-supporting leaf-spring 42 relative to one another, and are prevented from rotating about vertical axes relative to one another. The inner mounting-portion(s) 26 of each of the supplementary weight-supporting leaf-springs 42 is/are engaged directly or indirectly to whichever of the suspended structure 13 and a spring-support component 27 the inner mounting-portion(s) 26 of the primary leaf-spring 23 of the same leaf-spring group 24 is/are engaged to. The inner mounting-portion(s) 26 of each of the supplementary weight-supporting leaf-springs 42 is/are engaged to whichever of the suspended structure 13 and spring-support components 27 it/they is/are engaged to in such a manner that its/their position(s) and orientation(s) are fixed relative to whichever of the suspended structure 13 and spring-support component(s) 27 it/they is/are engaged to. Engagement of the supplementary weight-supporting leaf-springs 42 to the suspended structure 13 and the spring-support components 27 in such a manner that relative movements between them is constrained in the manners described above may be accomplished in any of a number of ways that are well-known to and/or easily imaginable by those of ordinary skill in the art. One manner in which the supplementary weight-supporting leaf-springs 42 may be engaged to the suspended structure 13 and the spring-support components 27 in order to effect such a restriction of movement is with the respective portions of the supplementary weight-supporting leaf-springs 42 engaged to the same components of the vehicle 10 and in the same manner as corresponding portions of the primary leaf-spring 23 of the same leaf-spring group 24. For instance, the first outer-mounting portion of a supplementary weight-supporting leaf-spring 42 may be pivotally engaged to a same part of a frame rail 37 of a vehicle 10 through a same spring bushing as is an anchor portion 28 of the primary leaf-spring 23 of the leaf-spring group 24. The most common manner of engagement of supplementary weight-supporting leaf-springs 42 to the suspended structure 13 and the spring-support components 27 is that which is depicted in FIG. 5. The novel suspension-system 34 shown in FIG. 5 has supplementary weight-supporting leaf-springs 42 that have an inner mounting-portion 26 that is clamped between the inner mounting-portion 26 of the primary leaf-spring 23 and the spring-support component 27 that supports the inner mounting-portions 26 of the primary leaf-springs 23 and the supplementary weight-supporting leaf-springs 42. In the embodiment of a novel suspension-system 34 depicted in FIG. 5, the outer mounting-portions 25 of the supplementary weight-supporting leaf-springs 42 are clamped to portions of the primary leaf-spring 23 between its inner mounting-portion 26 and its outer mounting-portions 25. In the preferred embodiment, as is depicted in the figures other than FIG. 5, the only weight-supporting leaf-spring of each leaf-spring group 24 is the primary leaf-spring 23. Construction of each leaf-spring group 24 with the primary leaf-spring 23 as the only weight-supporting leaf-spring is preferred because such a construction minimizes the hysteresis exhibited by the leaf-spring groups 24.

In some constructions of vehicles 10 the leaf-spring groups 24 of a novel suspension-system 34 may be subjected to loadings other than vertical, lateral, and longitudinal forces. For instance, the vehicle 10 of the preferred embodiment includes a novel suspension-system 34 that has leaf-spring groups 24 engaged to and supported by an axle beam 36 that is disposed transverse to the longitudinal axes of the leaf-spring groups 24. Also in the preferred embodiment, the axle beam 36 to which the leaf-spring groups 24 of the novel suspension-system 34 are mounted has braking units attached to it. The braking units are operable to resist relative rotation between the axle beam 36 and wheels 52 attached thereto in order to slow the movement of the vehicle 10 when it is desired to do so and the braking units are activated. When the vehicle 10 is in motion and the braking units are activated to resist relative rotation between the wheels 52 and the axle beam 36, the novel suspension-system 34 must apply a brake-reaction torque to the axle beam 36 to balance a brake torque applied to the axle beam 36 by the braking units. In the preferred embodiment thereof, the novel suspension-system 34 is constructed with pneumatic springs 20 that have a low spring rate and that are relatively close to the axle beam 36. Additionally, in the preferred embodiment of the novel suspension-system 34, each of the leaf-spring groups 24 comprises only one weight-supporting leaf-spring that weight-supporting leaf-spring being the primary leaf-spring 23. The primary leaf-spring 23 of each leaf-spring group 24 of the preferred embodiment further has a relatively low stiffness against bending within vertical planes through its longitudinal axis as compared to traditional constructions of leaf-spring groups of suspension systems. As was discussed in greater detail above, the construction of the novel suspension-system 34 with pneumatic springs 20 with a low spring rate and leaf-spring groups 24 with a low spring rate and hysteresis produces an advantageously soft ride for the suspended structure 13. One disadvantage associated with the pneumatic springs 20 having a low spring rate and the primary leaf-springs 23 being flexible to bending within vertical planes through their longitudinal axes is that, as compared to traditional leaf-spring groups with multiple and/or stiff weight-supporting leaf-springs, the pneumatic springs 20 and the primary leaf-springs 23 provide a relatively low brake-reaction torque for a given amount of roll of the axle beam 36 about its longitudinal axis. In the preferred embodiment of the present invention, each of the leaf-spring groups 24 of the novel suspension-system 34 includes an anti-windup leaf-spring 45 that increases the brake-reaction torque that the leaf-spring group 24 can apply to the axle beam 36 without substantially increasing the vertical spring rate of the leaf-spring group 24. Each anti-windup leaf-spring 45 has an anchor portion 28 that is engaged directly or indirectly to whatever component the anchor portion 28 of the primary leaf-spring 23 is engaged to. The engagement of the anchor portion 28 of each anti-windup leaf-spring 45 to whatever component the anchor portion 28 of the primary leaf-spring 23 is engaged to is such that relative to whatever component the anchor portion 28 of the primary leaf-spring 23 is engaged to, translation of the anchor portion 28 of the anti-windup leaf-spring 45 is prevented in all directions, rotation of the anchor portion 28 of the anti-windup leaf-spring 45 is prevented about a longitudinal axis of the anti-windup leaf-spring 45, and rotation of the anchor portion 28 of the anti-windup leaf-spring 45 about vertical axes is prevented. An engagement of the anchor portion 28 of an anti-windup leaf-spring 45 to whatever component the anchor portion 28 of the primary leaf-spring 23 is engaged to that will effect such a constriction of the movement of the anchor portion 28 of the anti-windup leaf-spring 45 could be of any of a number of designs that are well-known to and/or easily imaginable by one of ordinary skill in the art. In the preferred embodiment the anchor portion 28 of the anti-windup leaf-spring 45 wraps around the anchor portion 28 of the primary leaf-spring 23 and is, thus, pivotally engaged to the frame rail 37 about and through the same spring bushing that the anchor portion 28 of the primary leaf-spring 23 is pivotally engaged to the frame rail 37 about and through. Each ant-windup leaf-spring 45 also comprises a cantilevered mounting-portion 50 that is disposed at a distance along a longitudinal axis of the anti-windup leaf-spring 45 from the anchor portion 28 of the ant-windup leaf-spring 45. The cantilevered mounting-portion 50 of the anti-windup leaf-spring 45 is engaged to whatever structure the inner mounting-portion(s) 26 of the primary leaf-spring 23 of the leaf-spring group 24 is/are engaged to. The cantilevered mounting-portion 45 of each primary leaf-spring 23 is engaged to whatever structure the inner mounting-portion(s) 26 of the primary leaf-spring 23 are engaged to in such a manner that the cantilevered mounting-portion 50 is prevented from rotating about axes perpendicular to its longitudinal axis relative to the structure that the inner-mounting portion(s) 26 of the primary leaf-spring 23 are engaged to. Engagement of the cantilevered mounting-portion 50 of an anti-windup leaf-spring 45 to whatever structure the inner mounting-portion(s) 26 of the primary leaf-spring 23 are engaged to may be of any of a number of designs that are well-known to and/or easily imaginable by one of ordinary skill in the art and that would effect such a prohibition of relative rotation therebetween. The engagement of the cantilevered mounting-portion 50 of an anti-windup leaf-spring 45 to whatever structure the inner mounting-portion(s) 26 of the primary leaf-spring 23 are engaged to may be such that the cantilevered mounting-portion 50 may slide along its longitudinal axis relative to whatever structure the inner mounting-portion(s) 26 of the primary leaf-spring 23 are engaged to. The engagement of the cantilevered mounting-portion 50 of an anti-windup leaf-spring 45 to whatever structure the inner mounting-portion(s) 26 of the primary leaf-spring 23 are engaged to may be such that the cantilevered mounting-portion 50 may rotate about its longitudinal axis relative to whatever structure the inner mounting-portion(s) 26 of the primary leaf-spring 23 are engaged to. The engagement of the cantilevered mounting-portion 50 of an anti-windup leaf-spring 45 to whatever structure the inner mounting-portion(s) 26 of the primary leaf-spring 23 are engaged to may even be such that the cantilevered mounting-portion 50 may translate in horizontal directions perpendicular to its longitudinal axis relative to whatever structure the inner mounting-portion(s) 26 of the primary leaf-spring 23 are engaged to. In the preferred embodiment, the cantilevered mounting-portion 50 of each anti-windup leaf-spring 45 is clamped to the axle beam 36 that the inner mounting-portion 26 of the primary leaf-spring 23 is clamped to. In the preferred embodiment the cantilevered mounting-portion 50 of the anti-windup leaf-spring 45 is clamped to the axle beam 36 in such a manner that all rotation and translation of the cantilevered mounting-portion 50 of the anti-windup leaf-spring 45 relative to the axle beam 36 is prevented. As a result of such an engagement of the anti-windup leaf-spring 45 to the axle beam 36 and to the frame rail 37, the anti-windup leaf-spring 45 acts as a beam cantilevered from the axle beam 36 to resist rotation of the axle beam 36 about its longitudinal axis relative to the frame rail 37. Each of the anti-windup leaf-springs 45 of the preferred embodiment of the novel suspension-system 34 comprises a tail portion 46 that extends from the cantilevered mounting-portion 50 away from the anchor portion 28 of the anti-windup leaf-spring 45. The tail portion 46 of each anti-windup leaf-spring 45 extends away from the cantilevered mounting-portion 50 thereof at such an angle that there is a gap between the tail portion 46 and the primary leaf-spring 23 when the vehicle 10 is lightly loaded. When the braking units of the vehicle 10 of the preferred embodiment are activated and sufficient brake torque is applied to the axle beam 36 to rotate it to a degree that the tail portion 46 of the anti-windup leaf-spring 45 abuts the primary leaf-spring 23, the tail portion 46 acts as a beam cantilevered from the axle beam 36 to increase the resistance of the anti-windup leaf-spring 45 to rotation of the axle beam 36 about its longitudinal axis. It will of course be understood that an anti-windup leaf-spring 45 of a novel suspension-system 34 according to the present invention may not comprise a tail portion 46 and that in such a case no portion of the anti-windup leaf-spring 45 would extend beyond the cantilevered mounting-portion 50 of the anti-windup leaf-spring 45. In the preferred embodiment of the present invention, other than its engagement to the cantilevered mounting-portion 50 of the anti-windup leaf-spring 45, the only engagement of the tail portion 46 to other structure of the vehicle 10 is the abutment that occurs between the tail portion 46 and the primary leaf-spring 23 when sufficient brake torque is applied to the axle beam 36 to cause such abutment. Because the only engagements of the anti-windup leaf-spring 45 to the vehicle 10 are, in most circumstances, the pivotal engagement of its anchor portion 28 to the frame rail 37 and the rotationally fixed engagement to the axle beam 36 of the cantilevered mounting-portion 50 the anti-windup leaf-spring 45 increases the brake-reaction torque that is provided by its leaf-spring group 24 for a given amount rotation of the axle beam 36 without substantially increasing the spring rate or the hysteresis of its leaf-spring group 24. It will of course be understood that anti-windup leaf-springs 45 can be used in the leaf-spring groups 24 of embodiments of novel suspension-systems 34 according to the present invention other than those of the preferred embodiment in order to provide reaction torque to balance torques applied to the spring-support components 27 and/or the suspended structure 13 of the vehicle 10. Any embodiment of a novel suspension-system 34 according to the present invention that includes anti-windup leaf-springs 45 would have the cantilevered mounting-portion 50 of each of those anti-windup leaf-springs 45 fix rotationally fixed as described above to whatever component(s) the inner mounting-portion(s) 26 of the primary leaf-spring 23 are engaged to and would further have the anchor portion 28 of each of the anti-windup leaf-springs 45 engaged to whatever component the anchor portion 28 of the primary leaf-spring 23 is engaged to in such a manner that all translation therebetween is prevented. Additionally any portion of an anti-windup leaf-spring 45 that extends from its cantilevered mounting-portion 50 away from its anchor portion 28 must be free of any direct engagement to the reciprocating mounting-portion 29 of the primary leaf-spring 23 and the structure to which the reciprocating mounting-portion 29 of the primary leaf-spring 23 is engaged so that the anti-windup leaf-spring 45 does not substantially add to the spring rate of the leaf-spring group 24.

A novel suspension-system 34 according to the present invention may further comprise auxiliary springs 48 that are mounted directly or indirectly to either spring-support components 27 or the suspended structure 13 and that assist in supporting the suspended structure 13 only when the suspended structure 13 is heavily loaded or is subjected to dynamic events that cause portions thereof to apply large forces to one or more leaf-spring groups 24 of the novel suspension-system 34. The auxiliary springs 48 of a novel suspension-system 34 according to the present invention are mounted directly or indirectly to either the suspended structure 13 or spring-support component(s) 27 in such a position that, when the suspended structure 13 is in a static, lightly-loaded situation, the auxiliary springs 48 are not engaged to whichever of the suspended structure 13 and the spring-support components 27 they are not mounted to. In other words, if an auxiliary spring 48 is mounted to the suspended structure 13, when the suspended structure 13 is in a static, lightly-loaded situation, the auxiliary spring 48 is out of contact with any spring-support components 27 and any components engaged directly thereto. Similarly, if an auxiliary spring 48 is mounted to one or more spring-support components 27, when the suspended structure 13 is in a static, lightly-loaded situation, the auxiliary spring 48 is out of contact with the suspended structure 13 and any components engaged directly thereto. Each of the auxiliary springs 48 of a novel suspension-system 34 according to the present invention are, however, disposed in positions such that, when the suspended structure 13 is heavily loaded or is subjected to dynamic events that cause it or certain portions thereof to travel vertically downwardly, the auxiliary spring 48 will be engaged between the suspended structure 13 and one or more spring-support components 27 in a weight supporting manner. Auxiliary springs 48 of a novel suspension-system 34 according to the present invention may be of any of a number of designs of springs that are well-known and/or easily imaginable to one of ordinary skill in the art. The auxiliary springs 48 may comprise one or more leaf springs. In the preferred embodiment the auxiliary springs 48 are elastomer springs each of which is mounted to an underside of a respective frame rail 37 at a point above the leaf-spring clamp-plate/pneumatic-spring mounting-pad 39. The auxiliary springs 48 of the preferred embodiment are of such a length that, when the frame structure 30, which is the suspended structure 13, is in a static, lightly-loaded situation, there is a gap present between a free end of each auxiliary spring 48 and the leaf-spring clamp-plate/pneumatic-spring mounting-pad 39. At some point, as the loading of the frame structure 30 increases or increasing torques applied to the frame structure 30 about its longitudinal axis, as a result of dynamic events, cause increasing rotation of the frame structure about its longitudinal axis, the lower end of one or more auxiliary springs 48 contacts the leaf-spring clamp-plate/pneumatic-spring mounting-pad 39. Once the free end of the auxiliary spring 48 is in contact with the leaf-spring clamp-plate/pneumatic-spring mounting-pad 39 it thereafter resists further movement of the portion of the frame rail 37 that it is mounted to toward the leaf-spring clamp-plate/pneumatic-spring mounting-pad 39 that its lower end is in contact with. Such an inclusion of auxiliary springs 48 in the novel suspension-system 34 allows for a gentle ride in circumstances where the vehicle 10 is lightly-loaded and is traveling over relatively smooth ground while providing appropriate load support and roll control when the vehicle 10 is heavily loaded, is involved high speed turning maneuvers, and/or is traveling over rough terrain.

Those skilled in the art will appreciate that modifications could be made to the invention as described and in some instances some features of the invention will be employed without a corresponding use of other features without departing from the spirit and scope of the invention and thus the scope of the invention is limited only by the following claims.

We claim:

1. A vehicle, comprising:
   (a) one or more frame structure(s) to which a majority of other components of said vehicle are directly or indirectly engaged and which provide structure strength which maintains proper relative locations of said other components of said vehicle;
   (b) a primary suspension-system;
   (c) wherein said primary suspension-system of said vehicle comprises one or more ground-engaging component(s) such as wheel(s), track(s), and/or runner(s) that move along the ground when said vehicle is in motion;

(d) wherein said primary suspension-system of said vehicle further comprises a plurality of springs that are engaged between said ground-engaging component(s) and said frame structure(s) of said vehicle, and which support said frame structure(s) of said vehicle in a cushioned manner;

(e) one or more body structure(s) each of which is directly or indirectly engaged to and supported by said frame structure(s) of said vehicle;

(f) wherein said primary suspension-system includes said plurality of springs that are engaged to and supported directly or indirectly by an axle beam of said primary suspension-system and that are engaged directly or indirectly to and support one of said one or more frame structure(s) of said vehicle in a cushioned manner;

(g) wherein said plurality of springs of said primary suspension-system comprise two or more leaf-spring groups;

(h) wherein each of said leaf-spring groups comprises a primary leaf-spring which has an outer mounting-portion that is an anchor portion and another outer mounting-portion that is a reciprocating mounting-portion and an inner mounting-portion;

(i) wherein said one or more frame structure(s) that is supported by said primary suspension-system comprises two frame rails that extend parallel to one another and a longitudinal axis of said vehicle;

(j) wherein said anchor portion of each of said primary leaf-springs is pivotally engaged about a horizontal axis transverse to said longitudinal axis of said vehicle to one of said frame rails through a spring bushing;

(k) wherein said reciprocating mounting-portion of each of said primary leaf-springs is engaged to a same frame rail as is said anchor portion of said primary leaf-spring through a slipper joint or through a spring shackle;

(l) wherein each of said primary leaf-springs has its inner mounting-portion fixedly engaged to said axle beam;

(m) wherein said primary suspension-system of said vehicle further comprises one or more pneumatic spring(s) each of which has a support mounting-portion thereof engaged directly or indirectly to said one or more frame structure(s) that is supported by said primary suspension-system and each of which has a supported mounting-portion thereof engaged directly or indirectly to said axle beam such that said pneumatic springs act in parallel to said leaf-spring groups to support said frame structure(s);

(n) each of said leaf-spring groups comprises an anti-windup leaf-spring;

(o) each of said anti-windup leaf-springs comprises an anchor portion that is pivotally engaged about a horizontal axis transverse to said longitudinal axis of said vehicle to a same frame rail as is said primary leaf-spring of said leaf-spring group of which said anti-windup leaf is part;

(p) each of said anti-windup leaf-springs comprises a cantilevered mounting-portion that is disposed at a distance along a longitudinal axis of said anti-windup leaf-spring from said anchor portion thereof and that is engaged to said axle beam in such a manner that, relative to said axle beam, rotation of said cantilevered mounting-portion about a longitudinal axis of said axle beam is prevented; and (q) any portion of each of said anti-windup leaf-springs that extends from said cantilevered mounting-portion away from said anchor portion thereof is free of any direct engagement to said reciprocating mounting-portion of said primary leaf-spring and said structure to which said reciprocating mounting-portion of said primary leaf-spring is engaged.

2. The vehicle of claim 1, wherein:

(a) each of said leaf-spring groups comprises only one weight-supporting leaf-spring, that weight-supporting leaf-spring being said primary leaf-spring of said leaf-spring group.

3. A vehicle, comprising:

(a) a suspended structure is one or more frame structures to which a majority of other components of said vehicle are directly or indirectly engaged and which provide structural strength which maintains proper relative locations of said other components of said vehicle;

(b) a primary suspension-system;

(c) wherein said primary suspension-system of said vehicle comprises one or more ground-engaging component(s) such as wheel(s), track(s), and/or runner(s) that move along the ground when said vehicle is in motion;

(d) wherein said primary suspension-system of said vehicle further comprises a plurality of springs that are engaged between said ground-engaging component(s) and said frame structure(s) of said vehicle, and which support said frame structure(s) of said vehicle in a cushioned manner;

(e) one or more bad structure(s) each of which is directly or indirectly engaged to and supported by said frame structure(s) of said vehicle;

(f) said primary suspension-system which includes said plurality of springs that are engaged to and supported by a spring-support components and that are engaged directly or indirectly to and support said suspended structure of said vehicle in a cushioned manner;

(g) wherein said plurality of springs of said primary suspension-system comprise two or more leaf-spring groups;

(h) wherein each of said leaf-spring groups comprises a primary leaf-spring which has an outer mounting-portion that is an anchor portion and another outer mounting-portion that is a reciprocating mounting-portion and one or more inner mounting-portion(s);

(i) wherein each of said primary leaf-springs either has both of its outer mounting-portions engaged directly or indirectly to said suspended structure and not to said spring-support components or has both of its outer mounting-portions engaged directly or indirectly to one or more of said spring-support components and not to said suspended structure;

(j) wherein each of said primary leaf-springs has its inner mounting-portion(s) engaged directly or indirectly to whichever of said suspended structure and said spring-support components its outer mounting-portions are not engaged to;

(k) wherein each of said primary leaf-springs has its anchor portion engaged to whichever of said suspended structure and said spring-support components it is engaged to in such a manner that, relative to whichever of said suspended structure and said spring-support components said anchor portion is engaged to, translation of said anchor portion of said primary leaf-spring is prevented in all directions, rotation of said anchor portion of said primary leaf-spring about vertical axes is prevented, and rotation of said anchor portion of said primary leaf-spring about a longitudinal axis of said primary leaf-spring is prevented;

(l) wherein each of said primary leaf-springs has its reciprocating mounting-portion engaged to whichever of said suspended structure and said spring-support components it is engaged to in such a manner that, relative to whichever of said suspended structure and said spring-support components said reciprocating mounting-portion is enqaged to, translation of said reciprocating mounting-portion is prevented in all directions perpendicular to said longitudinal axis of said primary leaf-spring, rotation of said reciprocating mounting-portion about vertical axes is prevented, and rotation about said longitudinal axis of said primary leaf-spring is prevented;

(m) wherein each of said primary leaf-springs has its inner mounting-portion(s) engaged to whichever of suspended structure and said spring-support components said inner mounting-portion(s) are engaged to, in such a manner that, said inner mounting-portion(s) of said primary leaf-spring are translationally and rotationally fixed in all directions relative to whichever of said suspended structure and said spring-support components said inner mounting-portion(s) are engaged to;

(n) wherein said primary suspension-system of said vehicle further comprises one or more pneumatic spring(s) that is/are engaged directly or indirectly to said suspended structure and is/are engaged directly or indirectly to one or more spring-support component(s) of said primary suspension-system in such a manner that one or more of said pneumatic springs act(s) in parallel to said two or more leaf spring-groups to assist in supporting said suspended structure;

(o) one or more of said leaf-spring groups comprises an anti-windup leaf-spring;

(p) each of said anti-windup leaf-springs comprises an anchor portion that is engaged to a same structure as is said anchor portion of said primary leaf-spring of said leaf-spring group that comprises said anti-windup leaf-spring;

(q) said anchor portion of each of said anti-windup leaf-springs is engaged to said same structure as said anchor portion of said primary leaf-spring in such a manner that, relative to said structure to which said anchor portions of said primary leaf-spring and said anti-windup leaf-spring are engaged, translation of said anchor portion of said anti-windup leaf-spring is prevented in all directions, rotation of said anti-windup leaf-spring is prevented about a longitudinal axis of said anti-windup leaf-spring, and rotation of said anchor portion of said anti-windup leaf-spring is prevented about vertical axes;

(r) each of said anti-windup leaf-springs comprises a cantilevered mounting-portion that is disposed at a distance from said anchor portion of said anti-windup leaf-spiring along said longitudinal axis of said anti-windup leaf-spring;

(s) each of said cantilevered mounting-portions of each of said anti-windup leaf-springs is engaged to whatever structure said inner mounting portion(s) of said primary leaf-spring is/are engaged to in such a manner that said cantilevered mounting-portion is prevented from rotating about axes perpendicular to its longitudinal axis relative to whatever structure said inner-mounting portion(s) of said primary leaf-spring is/are engaged to;

(t) any portion of each of said anti-windup leaf-springs that extends from said cantilevered mounting-portion away from said anchor portion thereof is free of any direct engagement to said reciprocating mounting-portion of said primary leaf-spring and said structure to which said reciprocating mounting-portion of said primary leaf spring is engaged;

(u) said spring-support components that support said leaf-spring groups and said pneumatic springs of said primary suspension-system are supported by and/or include an axle beam of said primary suspension-system of said vehicle;

(v) said one or more frame structure(s) that are said suspended structure comprises two frame rails that extend parallel to one another and also to a longitudinal axis of said vehicle;

(w) each of two of said leaf-spring groups is engaged to an underside of one of said frame rails;

(x) said outer mounting-portions of each of said primary leaf-springs, of said two leaf-spring groups that are engaged to an underside of one of said frame rails, are engaged to an underside of one of said frame rails; and (y) said inner mounting-portion of each of said two primary leaf-springs, that have their outer mounting-portions engaged to said underside of one of said frame rails, is engaged to said axle beam of said primary suspension system.

* * * * *